(12) United States Patent
Kumoi et al.

(10) Patent No.: US 8,085,495 B2
(45) Date of Patent: Dec. 27, 2011

(54) SPINDLE MOTOR AND DISK-SHAPED MEDIUM RECORDING AND PRODUCING DEVICE

(75) Inventors: Masafumi Kumoi, Ehime (JP); Yukinori Maruyama, Ehime (JP)

(73) Assignee: Panasonic Corporation, Osaka (JP)

( * ) Notice: Subject to any disclaimer, the term of this patent is extended or adjusted under 35 U.S.C. 154(b) by 945 days.

(21) Appl. No.: 12/053,810

(22) Filed: Mar. 24, 2008

(65) Prior Publication Data

US 2008/0239570 A1 Oct. 2, 2008

(30) Foreign Application Priority Data

Apr. 2, 2007 (JP) ................................. 2007-096252

(51) Int. Cl.
*G11B 19/20* (2006.01)
*F16C 17/10* (2006.01)

(52) U.S. Cl. ...................... 360/99.08; 384/107; 384/112

(58) Field of Classification Search .................. 384/107, 384/112, 114, 121, 123; 360/98.07, 99.08
See application file for complete search history.

(56) References Cited

U.S. PATENT DOCUMENTS

| | | | |
|---|---|---|---|
| 6,431,757 B1 | 8/2002 | Nakazeki et al. | |
| 6,575,633 B2 | 6/2003 | Goto et al. | |
| 7,021,829 B2 | 4/2006 | Tamaoka | |
| 7,293,917 B2* | 11/2007 | Jang et al. | 384/123 |
| 7,448,805 B2* | 11/2008 | Kita et al. | 384/123 |
| 2007/0292060 A1* | 12/2007 | Kusaka et al. | 384/107 |

FOREIGN PATENT DOCUMENTS

| | | | |
|---|---|---|---|
| JP | 2001-124065 | | 5/2001 |
| JP | 2002-171719 | | 6/2002 |
| JP | 2004183768 A | * | 7/2004 |
| JP | 2005-45924 | | 2/2005 |
| WO | WO 2006049114 A1 | * | 5/2006 |

* cited by examiner

*Primary Examiner* — Will J Klimowicz
(74) *Attorney, Agent, or Firm* — Wenderoth, Lind & Ponack, L.L.P.

(57) ABSTRACT

A spindle motor can suppress the generation of noise during swinging and the extend service life, and also suppress the increase in current consumption. The outside diameter of a thrust hydrodynamic groove is at least 10% of the outside diameter of a disk-shaped medium, and the depth of the radial hydrodynamic groove is greater than the depth of the thrust hydrodynamic groove. By adjusting to specific numbers, the angular stiffness in the thrust bearing is raised, and even if a disturbance torque should be applied, wear or noise caused by metal contact inside the bearing can be suppressed.

2 Claims, 13 Drawing Sheets

$$\tan \Delta\theta = \frac{(Db - Ds)}{Lb}$$

$$\Delta x \cong \frac{(Db - Ds)}{2} + Hf \tan \Delta\theta$$

$$= (Db - Ds)\left(\frac{1}{2} + \frac{Hf}{Lb}\right)$$

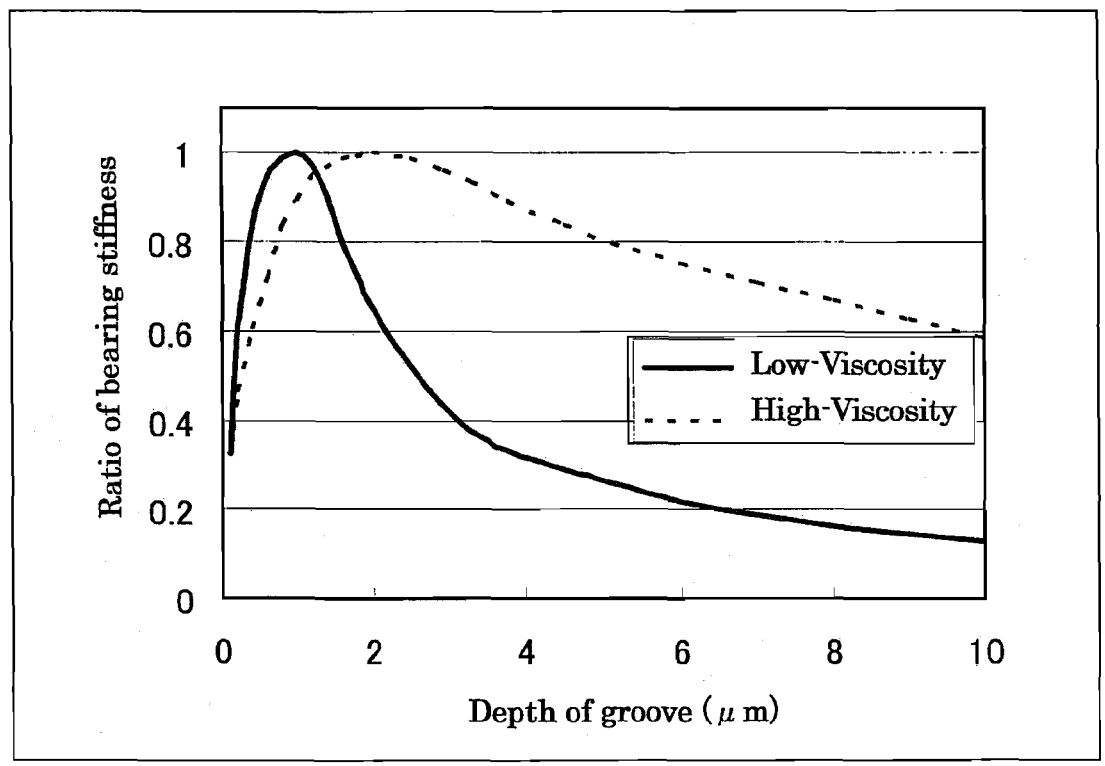
F I G. 9

SPINDLE MOTOR AND DISK-SHAPED MEDIUM RECORDING AND PRODUCING DEVICE

BACKGROUND OF THE INVENTION

1. Technical Field

The present invention relates to a hydrodynamic bearing spindle motor that is installed in a device for recording and reproducing information to and from a disk-shaped medium such as a hard disk drive (hereinafter referred to as HDD).

The present invention relates to a spindle motor for a HDD or the like in applications in which there is the possibility of a large swinging vibration being imparted, such as in mobile applications, and more particularly relates to technology for suppressing the generation of noise during swinging and suppressing an increase in current consumption in a spindle motor for a thin, small-diameter HDD.

2. Description of the Related Art

HDDs in which a hydrodynamic bearing spindle motor is installed have come to be widely used not only in notebook PCs, but also in digital audio players and so forth. A major prerequisite of a HDD used for mobile applications is that it be thin, and on top of this, it is particularly important that the device operate at low current consumption, and have dramatically suppressed disk vibration if subjected to disturbance vibration or the like. Many proposals have been made in an effort to satisfy these requirements.

For example, a structure has been proposed in which a large-diameter thrust bearing is constituted between the sleeve of the bearing and the hub on which the disk is mounted (see, for example, Japanese Laid-Open Patent Application 2005-045924). A structure has also been proposed in which the outer peripheral cylinder part of a large-diameter flat shaft is used as a radial bearing, and a thrust bearing is constituted at the upper and lower ends thereof (see, for example, Japanese Laid-Open Patent Application 2001-124065).

Furthermore, it has been proposed that a large-diameter flange be provided to the distal end of a shaft, so that when a disturbance moment is imparted, the load will be borne by both the radial bearing and the thrust flange, which increases the stiffness of the system as a whole (see, for example, Japanese Laid-Open Patent Application 2002-171719).

SUMMARY OF THE INVENTION

However, with the conventional structures discussed above, the focus was exclusively on raising bearing stiffness, the result being a large increase in the viscous frictional torque of the bearing in low-temperature environments. Nevertheless, since a large increase in current leads to markedly shorter cell life in mobile applications, it ends up being impossible to maintain adequate bearing stiffness, and sufficient robustness against a large disturbance cannot be obtained, although this does not pose any particular problems in PC applications, digital audio players, and so forth.

When a spindle motor such as this is installed in a HDD, and this product is used as a recording device for a compact camcorder about the size of a cell phone (a video camera with an integrated recording device component), a user can pan (swing to the left and right) the camera quickly, but the motor makes noise when panned rapidly, and it was found that this noise is picked up by the microphone of the camera and recorded, or that the bearing wears out. In the past, this phenomenon was particularly apt to occur at high temperatures. Such situations where noise is generated means that the internal part of the bearing is being subjected to sliding wear due to metal contact, which ends up shortening the life of the bearing.

The cause of this seems to be that when the orientation of the HDD is suddenly changed in a direction perpendicular to the rotational axis, a large gyro moment like that of a rotating gyroscope acts on the spindle, so a large moment is exerted in a different direction from the direction in which the external force was applied.

In particular, even when an attempt is made to receive the gyro moment with both a radial bearing and a thrust bearing as in Japanese Laid-Open Patent Application 2002-171719, since the gyro moment itself is applied perpendicular to the direction in which the external force is applied, there is the risk that the two bearings will adversely affect each other, which actually ends up producing an abnormal vibration noise.

Thus, a problem with prior art has been that it is difficult to ensure bearing stiffness in the high-temperature environments required of a mobile device, while at the same time lowering the current consumption in low-temperature environments.

The present invention solves these problems encountered in the past, and it is an object thereof to provide a spindle motor with which the generation of noise during swinging can be suppressed and the service life extended, and the increase in current consumption can also be suppressed.

To solve the above problems encountered in the past, the spindle motor of the present invention comprises a shaft, a thrust flange portion fixed or unified to the shaft, a sleeve, a thrust plate, a radial hydrodynamic groove, a thrust hydrodynamic groove, a lubricant, a radial bearing, and a thrust bearing. The sleeve has a bearing hole into which the shaft is relatively rotatably fitted via a microscopic gap in the radial direction. The thrust plate is disposed so as to sandwich, along with the sleeve, the thrust flange portion via a microscopic gap in the axial direction. The radial hydrodynamic groove is provided to the inner peripheral surface of the bearing hole and/or to the outer peripheral surface of the shaft. The thrust hydrodynamic groove is provided to the surface of the thrust plate and/or the surface of the thrust flange portion, or to the surface of the sleeve and/or the surface of the thrust flange portion. The lubricant fills the microscopic gap in the radial direction and the microscopic gap in the axial direction. The radial bearing is constituted by the radial hydrodynamic groove and the lubricant. The thrust bearing is constituted by the thrust hydrodynamic groove and the lubricant. Also, with the spindle motor of the present invention, a disk-shaped medium having a diameter of 33 to 53 mm, a specific gravity of 2.8 or less, and a thickness of 0.65 mm or less can be mounted. The outside diameter of the thrust hydrodynamic groove is at least 10% of the outside diameter of the disk-shaped medium, and the groove width ratio of the radial hydrodynamic groove is smaller than the groove width ratio of the thrust hydrodynamic groove.

Because the constitution is thus such that the outside diameter of the thrust hydrodynamic groove is larger by a specific amount than the disk-shaped medium, angular stiffness can be raised in the thrust bearing. Thus, even if a disturbance torque should be applied, wear or noise caused by metal contact inside the bearing can be suppressed.

Also, the larger is the groove width ratio, the more efficiently the lubricant can be collected, which means that bearing stiffness can be raised. Here, the groove width ratio of the radial hydrodynamic groove is smaller than that of the thrust hydrodynamic groove, so the angular stiffness in the radial bearing can be further lowered relative to the thrust bearing.

Thus, the design can be such that the gyro moment is received mainly by the thrust bearing, and the radial bearing only suppresses eccentricity of the disk. Accordingly, when a gyro moment is produced, the radial bearing and thrust bearing do not interfere with each other, and abnormal behavior caused by the gyro moment can be prevented. Furthermore, since the groove width ratio of the thrust hydrodynamic groove is larger than that of the radial hydrodynamic groove, even if the outside diameter of the thrust hydrodynamic groove is increased, the increase in viscous frictional torque in the thrust bearing can be reduced.

The term "groove width ratio" here refers to the average of the ratio (Lgr/Lr) between the length Lgr in the peripheral direction of the groove portion and the pitch length Lr in the peripheral direction.

Also, the spindle motor of the present invention comprises a shaft, a flange portion, a sleeve, a radial hydrodynamic groove, a thrust hydrodynamic groove, a lubricant, a radial bearing, and a thrust bearing. The flange portion is substantially disk-shaped, is fixed to the shaft directly or indirectly or unified to the shaft, and extends in the radial direction. The sleeve has a bearing hole into which the shaft is relatively rotatably fitted via a microscopic gap in the radial direction. The radial hydrodynamic groove is provided to the inner peripheral surface of the bearing hole and/or to the outer peripheral surface of the shaft. The thrust hydrodynamic groove is provided to the surface of the sleeve and/or the surface of the flange portion. The lubricant fills the microscopic gap in the radial direction and the microscopic gap in the axial direction. The radial bearing is constituted by the radial hydrodynamic groove and the lubricant. The thrust bearing is constituted by the thrust hydrodynamic groove and the lubricant. Also, with the spindle motor of the present invention, a disk-shaped medium having a diameter of 33 to 53 mm, a specific gravity of 2.8 or less, and a thickness of 0.65 mm or less can be mounted. The outside diameter of the thrust hydrodynamic groove is at least 10% of the outside diameter of the disk-shaped medium, and the groove width ratio of the radial hydrodynamic groove is smaller than the groove width ratio of the thrust hydrodynamic groove.

Because the constitution is thus such that the outside diameter of the thrust hydrodynamic groove is larger by a specific amount than the disk-shaped medium, angular stiffness can be raised in the thrust bearing. Thus, even if a disturbance torque should be applied, wear or noise caused by metal contact inside the bearing can be suppressed.

Also, the larger the groove width ratio, the more efficiently the lubricant can be collected, which means that bearing stiffness can be raised. Here, the groove width ratio of the radial hydrodynamic groove is smaller than that of the thrust hydrodynamic groove, so the angular stiffness in the radial bearing can be further lowered relative to the thrust bearing. Thus, the design can be such that the gyro moment is handled mainly by the thrust bearing, and the radial bearing only suppresses eccentricity of the disk. Accordingly, when a gyro moment is produced, the radial bearing and thrust bearing do not interfere with each other, and abnormal behavior caused by the gyro moment can be prevented. Furthermore, since the groove width ratio of the thrust hydrodynamic groove is larger than that of the radial hydrodynamic groove, even if the outside diameter of the thrust hydrodynamic groove is increased, the increase in viscous frictional torque in the thrust bearing can be reduced.

The term "groove width ratio" here refers to the average of the ratio (Lgr/Lr) between the length Lgr in the peripheral direction of the groove portion and the pitch length Lr in the peripheral direction.

Also, the spindle motor of the present invention comprises a shaft, a thrust flange portion that is fixed or unified to the shaft, a sleeve, a thrust plate, a radial hydrodynamic groove, a thrust hydrodynamic groove, a lubricant, a radial bearing, and a thrust bearing. The sleeve has a bearing hole into which the shaft is relatively rotatably fitted via a microscopic gap in the radial direction. The thrust plate is disposed so as to sandwich, along with the sleeve, the thrust flange portion via a microscopic gap in the axial direction. The radial hydrodynamic groove is provided to the inner peripheral surface of the bearing hole and/or to the outer peripheral surface of the shaft. The thrust hydrodynamic groove is provided to the surface of the thrust plate and/or the surface of the thrust flange portion, or to the surface of the sleeve and/or the surface of the thrust flange portion. The lubricant fills the microscopic gap in the radial direction and the microscopic gap in the axial direction. The radial bearing is constituted by the radial hydrodynamic groove and the lubricant. The thrust bearing is constituted by the thrust hydrodynamic groove and the lubricant. Also, with the spindle motor of the present invention, a disk-shaped medium having a diameter of 33 to 53 mm, a specific gravity of 2.8 or less, and a thickness of 0.65 mm or less can be mounted. The outside diameter of the thrust hydrodynamic groove is at least 10% of the outside diameter of the disk-shaped medium, and the depth of the thrust hydrodynamic groove is smaller than the depth of the radial hydrodynamic groove.

Because the constitution is thus such that the outside diameter of the thrust hydrodynamic groove is larger by a specific amount than the disk-shaped medium, angular stiffness can be raised in the thrust bearing. Thus, even if a disturbance torque should be applied, wear or noise caused by metal contact inside the bearing can be suppressed.

Also, the deeper the groove, the more efficiently the lubricant can be collected, but in the case of a low-viscosity lubricant such as that used in mobile applications, the bearing stiffness is at its peak at a groove depth of under 1 μm, and a groove depth greater than this will actually result in a decrease in bearing stiffness. Therefore, the shallower is the groove the higher the bearing stiffness can be. Furthermore, the deeper is the groove, the lower is the viscous frictional torque. Here, the angular stiffness in the radial bearing is further lowered relative to the thrust bearing by making the depth of the radial hydrodynamic groove greater than that of the thrust hydrodynamic groove. Thus, the design can be such that the gyro moment is received mainly by the thrust bearing, and the radial bearing only suppresses eccentricity of the disk. Accordingly, when a gyro moment is produced, the radial bearing and thrust bearing do not interfere with each other, and abnormal behavior caused by the gyro moment can be suppressed. Furthermore, since the radial hydrodynamic groove is deeper than the thrust hydrodynamic groove, the increase in viscous frictional torque in the radial bearing can be reduced.

Also, the spindle motor of the present invention comprises a shaft, a flange portion, a sleeve, a radial hydrodynamic groove, a thrust hydrodynamic groove, a lubricant, a radial bearing, and a thrust bearing. The flange portion is substantially disk-shaped, is fixed to the shaft directly or indirectly, or unified to the shaft, and extends in the radial direction. The sleeve has a bearing hole into which the shaft is relatively rotatably fitted via a microscopic gap in the radial direction. The radial hydrodynamic groove is provided to the inner peripheral surface of the bearing hole and/or to the outer peripheral surface of the shaft. The thrust hydrodynamic groove is provided to the surface of the sleeve and/or the surface of the flange portion. The lubricant fills the microscopic gap in the radial direction and the microscopic gap in the axial direction. The radial bearing is constituted by the radial hydrodynamic groove and the lubricant. The thrust bearing is constituted by the thrust hydrodynamic groove and the lubricant. Also, with the spindle motor of the present invention, a disk-shaped medium having a diameter of 33 to 53 mm, a specific gravity of 2.8 or less, and a thickness of 0.65 mm or less can be mounted. The outside diameter of the thrust hydrodynamic groove is at least 10% of the outside diameter of the disk-shaped medium, and the depth of the thrust hydrodynamic groove is smaller than the depth of the radial hydrodynamic groove.

Because the constitution is such that the outside diameter of the thrust hydrodynamic groove is larger by a specific amount than the disk-shaped medium, angular stiffness can be raised in the thrust bearing. Thus, even if a disturbance torque should be applied, there will be no metal contact inside the bearing, and wear and noise can be suppressed.

Also, the deeper the groove, the more efficiently the lubricant can be collected, but in the case of a low-viscosity lubricant such as used in mobile applications, the bearing stiffness is at its peak with a narrow gap of under 1 μm, and a gap larger than this will actually result in a decrease in bearing stiffness. Therefore, the shallower the groove the higher the bearing stiffness can be. Furthermore, the deeper the groove, the lower the viscous frictional torque. Here, the angular stiffness in the radial bearing is further lowered relative to the thrust bearing by making the depth of the radial hydrodynamic groove greater than that of the thrust hydrodynamic groove. Thus, the design can be such that the gyro moment is handled mainly by the thrust bearing, and the radial bearing only suppresses eccentricity of the disk. Accordingly, when a gyro moment is produced, the radial bearing and thrust bearing do not interfere with each other, and abnormal behavior caused by the gyro moment can be suppressed. Furthermore, since the radial hydrodynamic groove is deeper than the thrust hydrodynamic groove, the increase in viscous frictional torque in the radial bearing can be reduced.

Furthermore, the spindle motor of the present invention is a spindle motor that rotates a rotary-side member in relation to a stationary-side member around a shaft, comprising the shaft, a sleeve, a radial hydrodynamic groove, and a thrust hydrodynamic groove. The sleeve has a bearing hole into which the shaft is relatively rotatably fitted via a microscopic gap in the radial direction. The radial hydrodynamic groove is provided in the axial direction to the inner peripheral surface of the bearing hole of the sleeve and/or to the outer peripheral surface of the shaft. The thrust hydrodynamic groove is provided in the radial direction of the rotation to the surface of the rotary-side member and/or the surface of the stationary-side member, which are mutually opposed. The groove width ratio of the radial hydrodynamic groove is smaller than the groove width ratio of the thrust hydrodynamic groove.

Here, the larger the groove width ratio, the more efficiently the lubricant can be collected, which means that bearing stiffness can be raised. Here, the groove width ratio of the radial hydrodynamic groove is smaller than that of the thrust hydrodynamic groove, so the angular stiffness in the radial bearing can be lowered relative to the thrust bearing. Thus, the design can be such that the gyro moment is handled mainly by the thrust bearing, and the radial bearing only suppresses eccentricity of the disk. Accordingly, when a gyro moment is produced, the radial bearing and thrust bearing do not interfere with each other, and abnormal behavior caused by the gyro moment can be prevented. Furthermore, since the groove width ratio of the thrust hydrodynamic groove is larger than that of the radial hydrodynamic groove, even if the outside diameter of the thrust hydrodynamic groove is increased, the increase in viscous frictional torque in the thrust bearing can be reduced.

The term "groove width ratio" here refers to the ratio (Lgr/Lr) between the length Lgr in the peripheral direction of the groove portion and the pitch length Lr in the peripheral direction.

It is also conceivable that the disk-shaped medium to be mounted is one having a diameter of 33 to 53 mm, a specific gravity of 2.8 or less, and a thickness of 0.65 mm or less.

Furthermore, the spindle motor of the present invention is a spindle motor that rotates a rotary-side member in relation to a stationary-side member around a shaft, comprising a shaft, a sleeve, a radial hydrodynamic groove, and a thrust hydrodynamic groove. The sleeve has a bearing hole into which the shaft is relatively rotatably fitted via a microscopic gap in the radial direction. The radial hydrodynamic groove is provided in the axial direction to the inner peripheral surface of the bearing hole of the sleeve and/or to the outer peripheral surface of the shaft. The thrust hydrodynamic groove is provided in the radial direction of the rotation to the surface of the rotary-side member and/or the surface of the stationary-side member, which are mutually opposed. The outside diameter of the thrust hydrodynamic groove is at least 10% of the outside diameter of the disk-shaped medium.

Because the constitution is such that the outside diameter of the thrust hydrodynamic groove is larger by a specific amount than the disk-shaped medium, angular stiffness can be raised in the thrust bearing. Thus, even if a disturbance torque should be applied, wear or noise caused by metal contact inside the bearing can be suppressed.

It is also conceivable that the disk-shaped medium to be mounted is one having a diameter of 33 to 53 mm, a specific gravity of 2.8 or less, and a thickness of 0.65 mm or less.

Furthermore, the spindle motor of the present invention is a spindle motor that rotates a rotary-side member in relation to a stationary-side member around a shaft, comprising a shaft, a sleeve, a radial hydrodynamic groove, and a thrust hydrodynamic groove. The sleeve has a bearing hole into which the shaft is relatively rotatably fitted via a microscopic gap in the radial direction. The radial hydrodynamic groove is provided in the axial direction to the inner peripheral surface of the bearing hole of the sleeve and/or to the outer peripheral surface of the shaft. The thrust hydrodynamic groove is provided in the radial direction of the rotation to the surface of the rotary-side member and/or the surface of the stationary-side member, which are mutually opposed. The disk-shaped medium to be mounted is one having a diameter of 33 to 53 mm, a specific gravity of 2.8 or less, and a thickness of 0.65 mm or less. The depth of the thrust hydrodynamic groove is smaller than the depth of the radial hydrodynamic groove.

Here, the deeper the groove, the more efficiently the lubricant can be collected, but in the case of a low-viscosity lubricant such as is used in mobile applications, the bearing stiffness is at its peak at a groove depth of under 1 μm, and a groove depth greater than this will actually result in a decrease in bearing stiffness. Therefore, the shallower the groove the higher the bearing stiffness can be. Furthermore, the deeper the groove, the lower the viscous frictional torque.

Here, the angular stiffness in the radial bearing is lowered relative to the thrust bearing by making the depth of the radial hydrodynamic groove greater than that of the thrust hydrodynamic groove. Thus, the design can be such that the gyro moment is handled mainly by the thrust bearing, and the radial bearing only suppresses eccentricity of the disk. Accordingly, when a gyro moment is produced, the radial bearing and thrust bearing do not interfere with each other, and abnormal behavior caused by the gyro moment can be suppressed. Furthermore, since the radial hydrodynamic groove is deeper than the thrust hydrodynamic groove, the increase in viscous frictional torque in the radial bearing can be reduced.

It is also conceivable that the disk-shaped medium to be mounted is one having a diameter of 33 to 53 mm, a specific gravity of 2.8 or less, and a thickness of 0.65 mm or less.

Furthermore, the spindle motor of the present invention is a spindle motor that rotates a rotary-side member in relation to a stationary-side member around a shaft, comprising a shaft, a sleeve, a radial hydrodynamic groove, and a thrust hydrodynamic groove. The sleeve has a bearing hole into which the shaft is relatively rotatably fitted via a microscopic gap in the radial direction. The radial hydrodynamic groove is provided in the axial direction to the inner peripheral surface of the bearing hole of the sleeve and/or to the outer peripheral surface of the shaft. The thrust hydrodynamic groove is provided in the radial direction of the rotation to the surface of the rotary-side member and/or the surface of the stationary-side member, which are mutually opposed. The outer side depth of the thrust hydrodynamic groove is smaller than the inner side depth of the thrust hydrodynamic groove.

Here, the deeper the groove, the more efficiently the lubricant can be collected, but in the case of a low-viscosity lubricant such as is used in mobile applications, the bearing stiffness is at its peak at a groove depth of under 1 μm, and a groove depth greater than this will actually result in a decrease in bearing stiffness. Therefore, the shallower the groove the higher the bearing stiffness can be. Furthermore, the deeper the groove, the lower the viscous frictional torque.

Since the inner thrust hydrodynamic groove is deeper than that of the outer side, the increase in viscous frictional torque in the radial bearing can be reduced, while obtaining bearing stiffness.

It is also conceivable that the disk-shaped medium to be mounted is one having a diameter of 33 to 53 mm, a specific gravity of 2.8 or less, and a thickness of 0.65 mm or less.

Effect of the Invention

The spindle motor of the present invention can be applied to HDDs and so forth that are installed in devices that need to be thinner and consume less power and with which sudden panning and so forth are performed during use, such as compact camcorders and the like. In this case, the generation of noise by bearing sliding during use at high temperatures can be efficiently suppressed, and furthermore power consumption by the motor at low temperatures can be kept to a minimum.

BRIEF DESCRIPTION OF THE DRAWINGS

FIG. 9 is a graph of the relationship between the thrust groove depth and bearing stiffness;

DETAILED DESCRIPTION OF THE INVENTION

Embodiments of the spindle motor of the present invention will now be described in detail along with the drawings.

Embodiment 1

Figure 1:
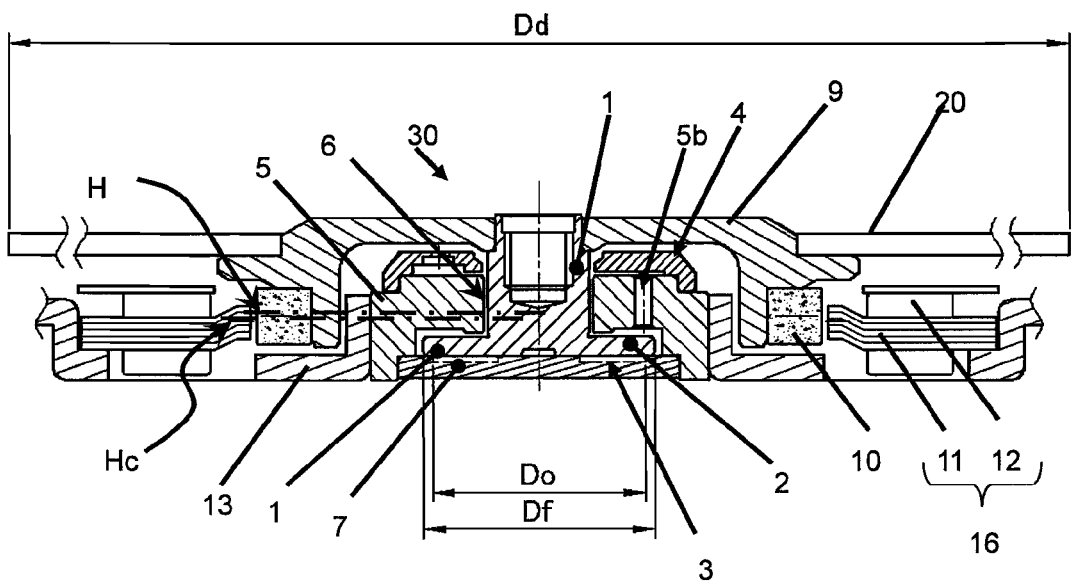
FIG. 1 is a cross section of a spindle motor in Embodiment 1 of the present invention.

FIG. 1 is a cross section of a spindle motor in a first embodiment of the present invention. In the following description, the up and down direction in FIG. 1 will be referred to as the "axial direction," the up direction as the "upward axial direction," and the down direction as the "downward axial direction," but these are not intended to limit the actual attachment directions of the spindle motor.

Figure 5:
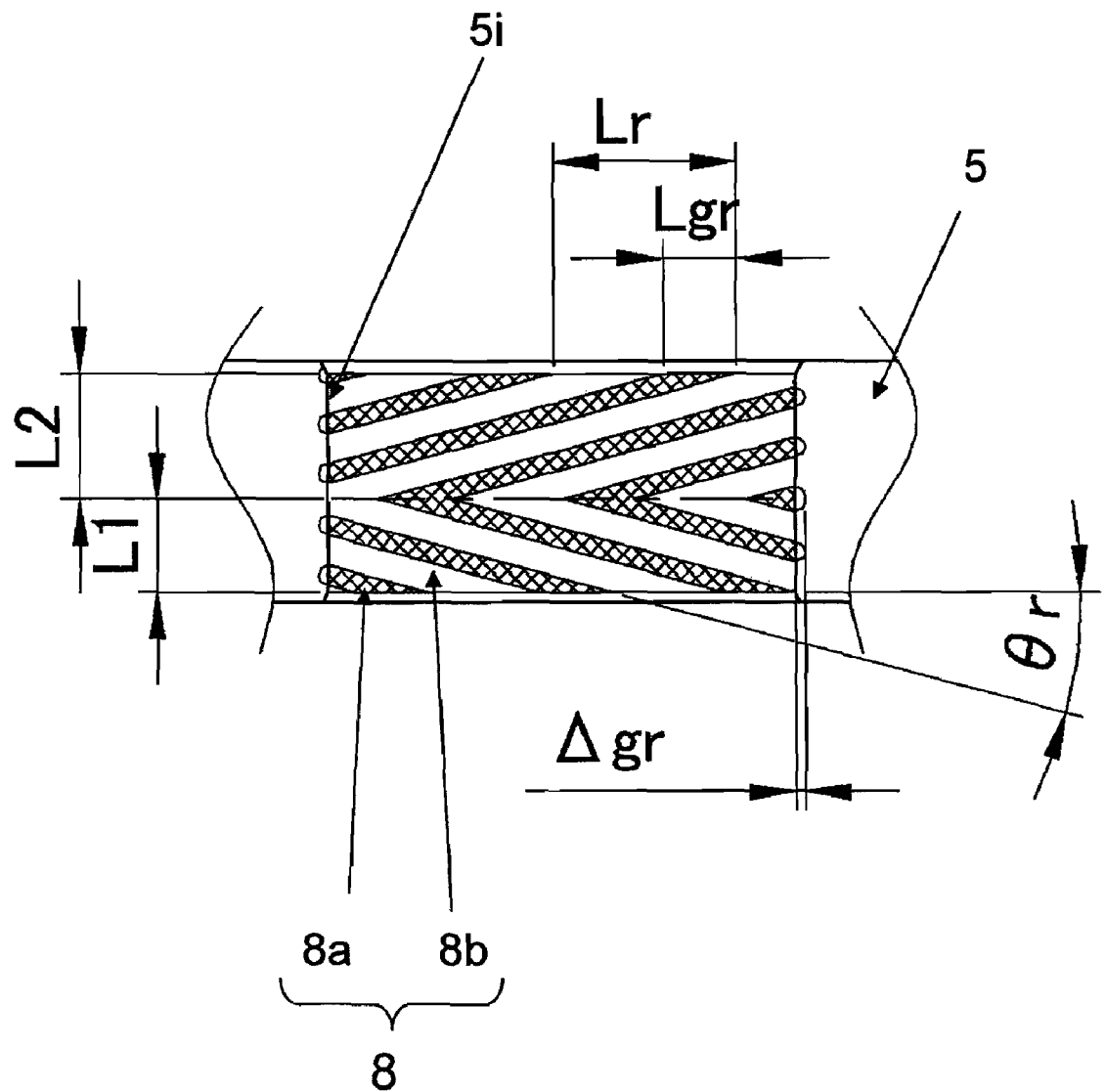
FIG. 5 is a cross section of the radial bearing in Embodiment 1 of the present invention.

With the spindle motor 30 shown in FIG. 1, a thrust flange 2 is fixed to the lower end of a shaft 1. This thrust flange 2 may be formed integrally with the shaft 1, or the two members may be joined by welding, press-fitting, or another suitable means. This shaft 1 is relatively rotatably fitted into a bearing hole 5$i$ of a sleeve 5 via a microscopic radial gap. Also, as shown in FIG. 5, a plurality of (8 here) herringbone-shaped radial hydrodynamic grooves 8 are formed in the inner peripheral cylindrical face of the bearing hole 5$i$.

Figure 2A:
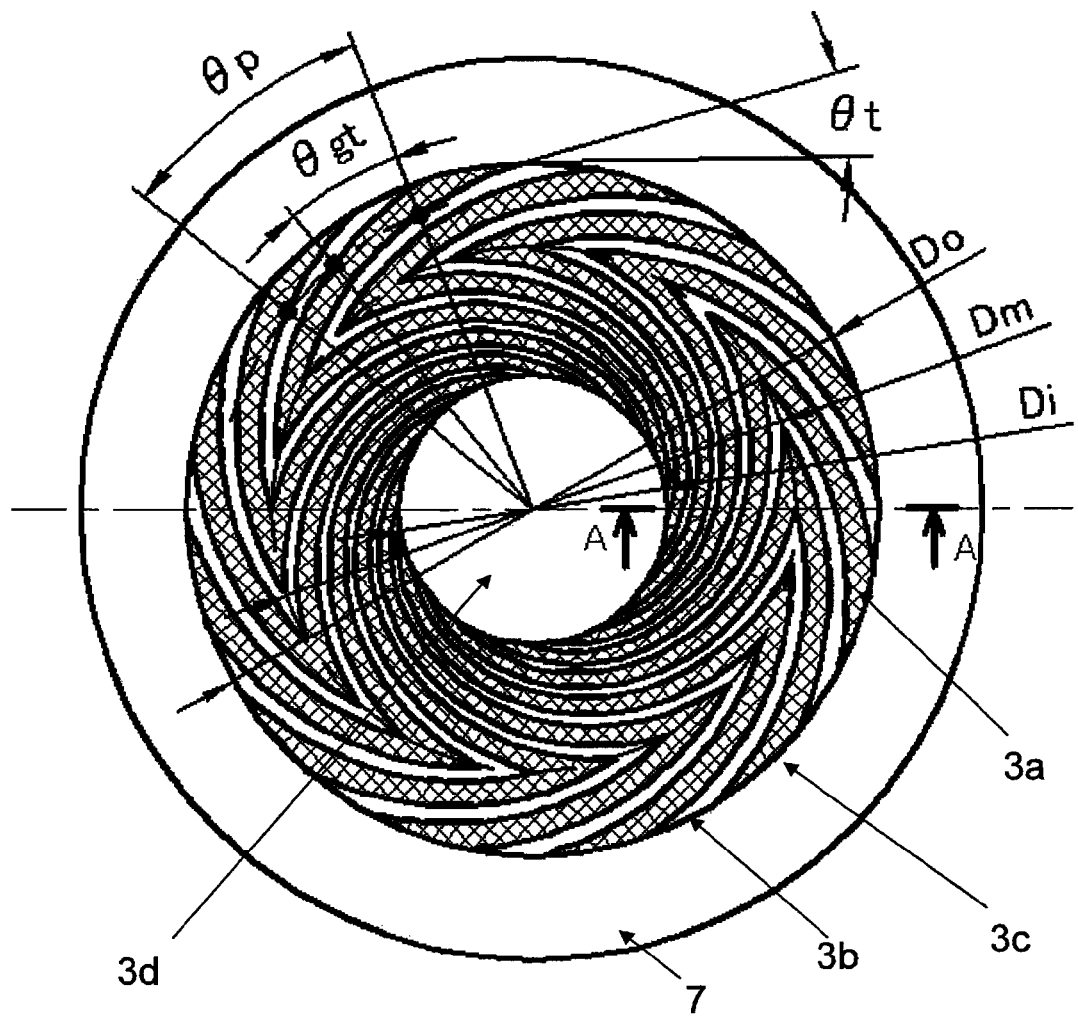
FIG. 2A is a plan view of the thrust hydrodynamic groove in Embodiment 1 of the present invention.

A thrust plate 7 is fixed to the lower end side of the sleeve 5 by crimping, welding, adhesive bonding, press-fitting, or another suitable means, so as to be across from the lower face of the thrust flange 2 via a microscopic axial gap, and this blocks off the lower end side of the sleeve 5. Also, as shown in FIG. 2A, a plurality of (12 here) herringbone-shaped thrust hydrodynamic grooves 3 are formed on the upper face side of the thrust plate.

A communicating hole 5$b$ is formed on the side near the outer periphery of the sleeve 5 to balance the pressure inside the bearing by communicating between the upper and lower end faces of the sleeve 5.

Here, the radial microscopic gap in which the thrust hydrodynamic grooves 3 is positioned, the axial microscopic gap in which the radial hydrodynamic grooves 8 is positioned, the communicating hole 5$b$, and so forth are filled with a lubricant 26, such as an ester oil, an ether oil, a high-fluidity grease, or an ionic liquid, to constitute a radial bearing 6 and a thrust bearing 15. This lubricant 26 is selected so as to suppress an increase in kinematic viscosity, particularly at low temperatures, and to reduce the evaporation rate in high temperature environments. As shown in Table 1, the specific value for kinematic viscosity is about 100 mm$^2$/sec at −20° C.

TABLE 1

| Temperature (° C.) | Kinematic viscosity (mm²/sec) |
|---|---|
| −20 | 85 to 117 |
| 0 | 30 to 39 |
| 20 | 14 to 17 |
| 40 | 8 to 9 |
| 60 | 5 to 6 |
| 85 | 3 to 4 |

Also, a sealing member 4 that works by capillary action is fixed to the upper open end side of the sleeve 5, through which the other end of the shaft 1 protrudes, and which reduces leakage of the lubricant from the upper open end side of the sleeve 5.

A hub 9 is fixed to the other end of the shaft 1 by press-fitting, adhesive bonding, welding, or another suitable means. A disk-shaped medium made of glass, aluminum, or another material with a low specific gravity is mounted on the hub 9.

In this Embodiment 1, one disk-shaped medium 20, produced by forming a magnetic layer, a protective layer, a lubricating film, and so forth on a glass substrate with a specific gravity of 2.5, an inside diameter of 12 mm, an outside diameter of 48 mm, and a thickness of 0.5 mm, is mounted by a clamp disk (not shown). The rotational speed of the disk is 3600 rpm.

The sleeve 5 is fixed to a base 13 by adhesive bonding, welding, or another suitable means. Also, a stator unit 16 comprising a coil 12 wound in a plurality of phases (3 phases here) on a stator core 11 having a plurality of slots (9 slots here) and produced by lamination of silicon steel sheets or the like, is fixed to the base 13. A magnet 10 is fixed by adhesive bonding, etc., to the lower end of the hub 9. The magnet 10 is a bonded magnet or sintered magnet made of a rare earth magnet material (based on Nd—Fe—B, Sm—Fe—N, Sm—Co, etc.), and the outer peripheral portion thereof is magnetized in a plurality of poles (12 poles here). The rotating portion is rotated relative to the stationary portion by interaction between the magnet 10 and the stator unit 16 produced by successively switching the power supplied to the coil 12. Here, the base 13 is produced by subjecting SUS430, steel sheet, or the like to electroless NiP plating, and generates magnetic attraction between itself and the end face of the magnet 10. Also, the axial center Hc of the inner periphery of the stator core 11 is offset from the axial center Hm of the magnet 10, and magnetic attraction is generated here as well. The axial direction portion of the magnetic attraction generated at these two places is set to be 700 mN. This value is set to approximately 17 times the weight (approximately 40 mN) of the rotating body including the disk-shaped medium 20.

Figure 11:
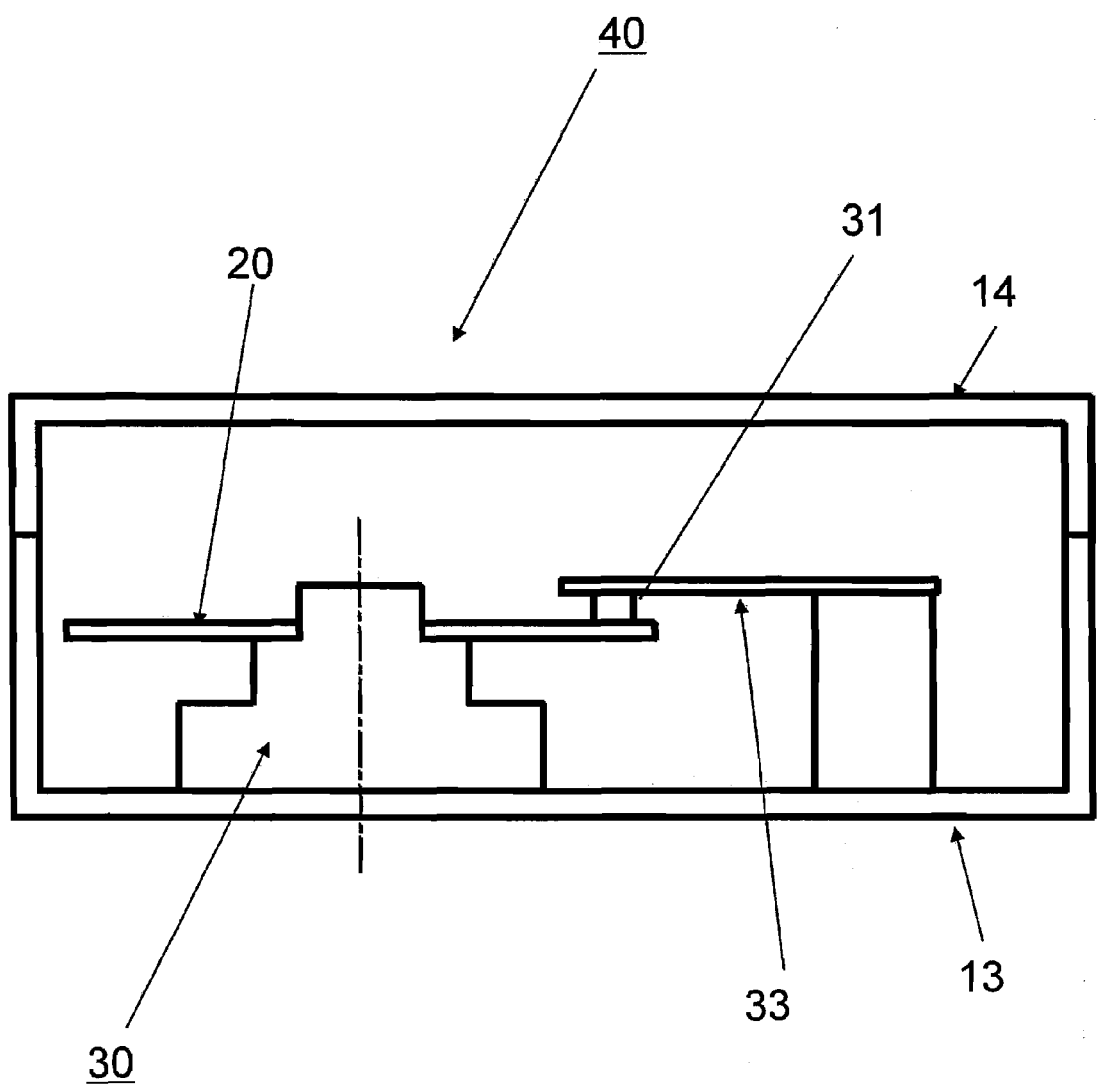
FIG. 11 is a cross section of a HDD device in which the spindle motor of the present invention is installed.

With the spindle motor 30 constituted as above, as shown in FIG. 11, one disk-shaped medium 20 is mounted, and a head 31 on which the spindle motor 30 is mounted is disposed across from the disk-shaped medium 20. The base 13 on which the spindle motor 30 is mounted is covered by a top cover 14, and this assembly is sealed so that outside air is blocked.

The bearing specifications will now be described in further detail.

The diameter Ds of the shaft 1 is 2.4 mm, and the radial gap between the shaft 1 and the bearing hole 5i of the sleeve 5 is approximately 2 μm. Also, as shown in FIG. 5, the axial length L1 of the lower half of the herringbone shape of the radial hydrodynamic grooves 8 is 0.6 mm, and the length of the upper half is 0.63 mm, creating an imbalance, and the lubricant is pushed in downward under a weak force. The axial position of the turn-back position of the herringbone pattern is moved closer to the axial center Hc of the inner periphery of the stator core 11 so that vibration caused by the radial direction component of the magnetic attraction received from the stator core 11 will be as small as possible.

The action of the spindle motor constituted as above will now be described.

Figure 7:
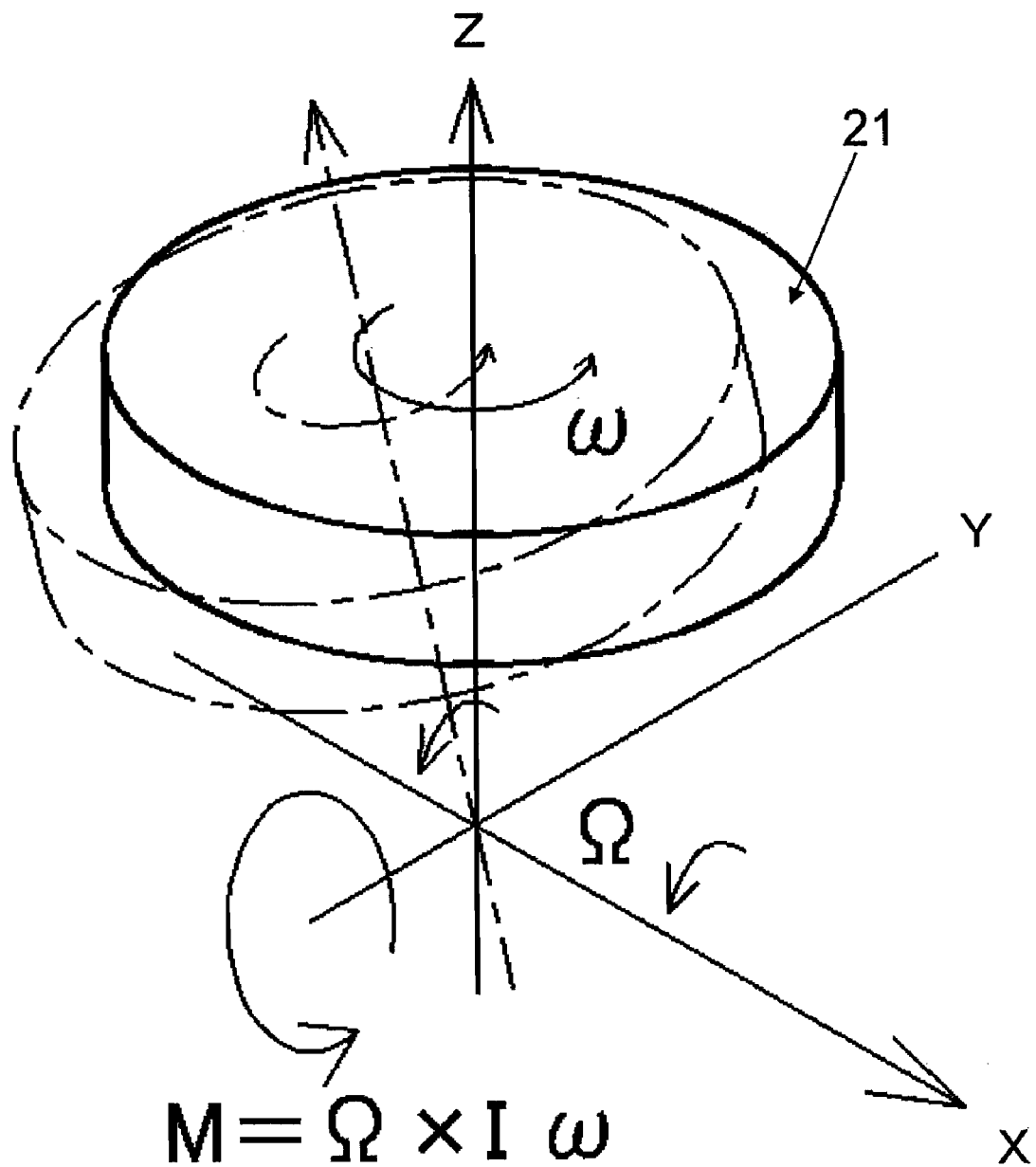
FIG. 7 is a concept diagram of the direction of the gyro moment during swinging.

As shown in FIG. 7, we will assume that a rotating body 21 is rotating at an angular velocity ω around a center axis (Z axis). We will let I be the inertial moment around the center axis here. If we assume here at the direction of the center axis is tilted by an angular velocity Ω around the X axis, then the rotating body 21 is subjected to a gyro moment M expressed by Formula 2 below. This gyro moment M is in the direction of the outer product of the vector Ω and the vector ω that is, a moment is exerted perpendicular the rotational axis ω and the disturbance torque Ω even though a disturbance torque is applied in the direction of Ω. The size of this gyro moment M is expressed by Formula 2, and is proportional to the rotational velocity ω, and to the inertial moment I, and to the disturbance angular velocity Ω. Here, as discussed below, we let the disk size be 2 inches or less, and the rotational speed be 5400 rpm or less.

$$M = \Omega \times I \omega \qquad \text{Formula 2}$$

Incidentally, with the spindle motor 30 on which is mounted the glass (specific gravity of 2.5) disk-shaped medium 20 having a thickness of 0.5 mm and an outside diameter of 48 mm (1.8 inches), the inertial moment I is 7.2 g cm². The inertial moment I of the disk-shaped medium 20 is dominant, and is 6.6 gcm², or 92% of the entire rotating body.

We investigated how much disturbance should be taken into account in the mounting of the HDD 40 in a camcorder. Countless scenarios can be envisioned, but in scenarios with too high a speed (such as when the user pans the camera on a racing machine driving right in front of him), there will be so much ambient noise that it is unreasonable to seek silence under such conditions in the first place. Also, such scenes can be photographed repeatedly any number of times, so there is no real problem if a small amount of noise should happen to creep in. Therefore, in scenarios such as when the subject crosses in front of the camera in a relatively quiet environment on a commemoration day or the like (for example, a scenario in which the subject crosses in front of the camera at a wedding, graduation ceremony, or the like), the image cannot be retaken, so it is undesirable for noise to be generated in such scenarios. When camera panning is considered from this standpoint, virtually the entire practical range can be covered if we assume panning for 0.5 second over an angle of 90 degrees (back and forth one time, 1 second). The disturbance angular velocity Ω when a state such as this is assumed is expressed by Formula 3.

Formula 3

$$\theta = \frac{\theta s}{2} \cos(2\pi * f * t)$$

$$\Omega = \frac{d\theta}{dt} = -\pi * f * \theta s * \sin(2\pi * f * t)$$

If we assume here that f=1 Hz and θs=π/2 (rad), we obtain |Ω|=4.93 rad/sec. If we assume here that I=7.2 gcm² and ω=377 rad/sec (3600 r/min), we obtain |M|=1.33 mNm (13.7 gfcm), which is a large value.

Also, during such sudden panning, the camera is usually held by hand (if mounted on a tripod, squeaking from the tripod can be a problem), so the camera is likely to be rotated in a state in which the distance from the shoulder to the wrist is about 30 cm.

Figure 6:
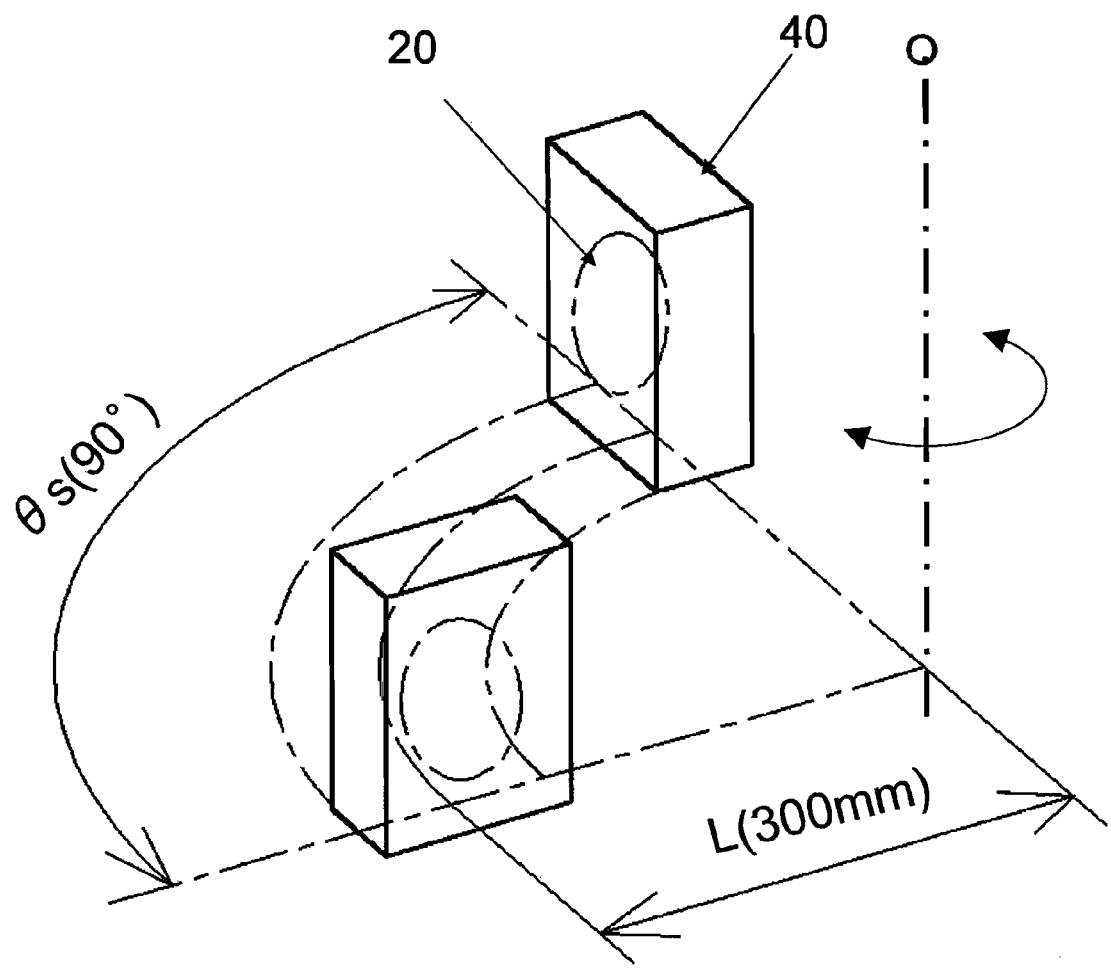
FIG. 6 is a concept diagram of a swing test.

As shown in FIG. 6, a measurement apparatus was configured so that the center of the disk-shaped medium 20 was located at a position of L=30 cm away from the rotational axis O, and so that the apparatus swung 90 degrees at 1 Hz, the bearing noise generated by the apparatus was recorded with a microphone attached to the back of the thrust plate at the lower part of the spindle motor, the sound was reproduced after the experiment, and the magnitude of the noise was evaluated by organoleptic test and assigned one of five grades (no sound, very small amount, small amount, medium amount, large amount). Of these, the two grades that pose almost no problem are "no sound" and "very small amount." However, the evaluation "no sound" was made by ignoring, by hearing, the dark noise level had by the swing test apparatus itself. As to the measurement environment, it was assumed that 40° C. is the highest ambient environment temperature that can usually be endured by humans. However, because it is conceivable that the inside of a camcorder housing could rise due to the heat generated by the various integrated circuits, the temperature was assumed to be 20° C. higher than the ambient environment temperature. The experiment itself was conducted in a thermostatic tank at 60° C. These results are given in Tables 2 to 5.

periphery 15o of the thrust bearing component 15 is across from the annular outer peripheral ridge 3c at a gap of ΔRt2=0.05 mm between the outside diameter Do of the thrust hydrodynamic grooves 3.

Figure 3A:
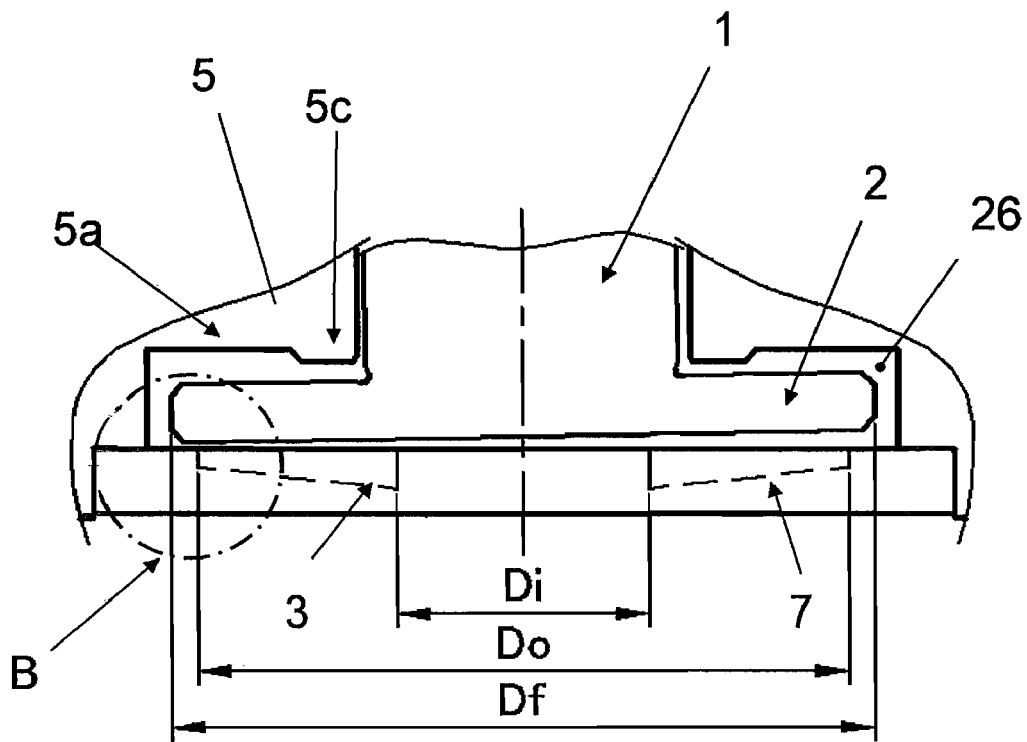
FIG. 3A is a cross section near the thrust bearing in Embodiment 1 of the present invention.
Figure 3B:
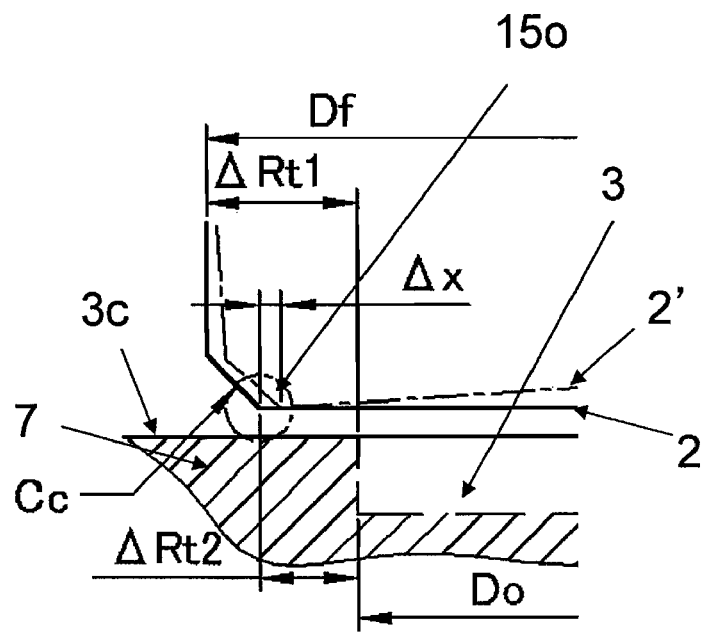
FIG. 3B is a detail view of the thrust flange portion outer peripheral end.
Figure 4:
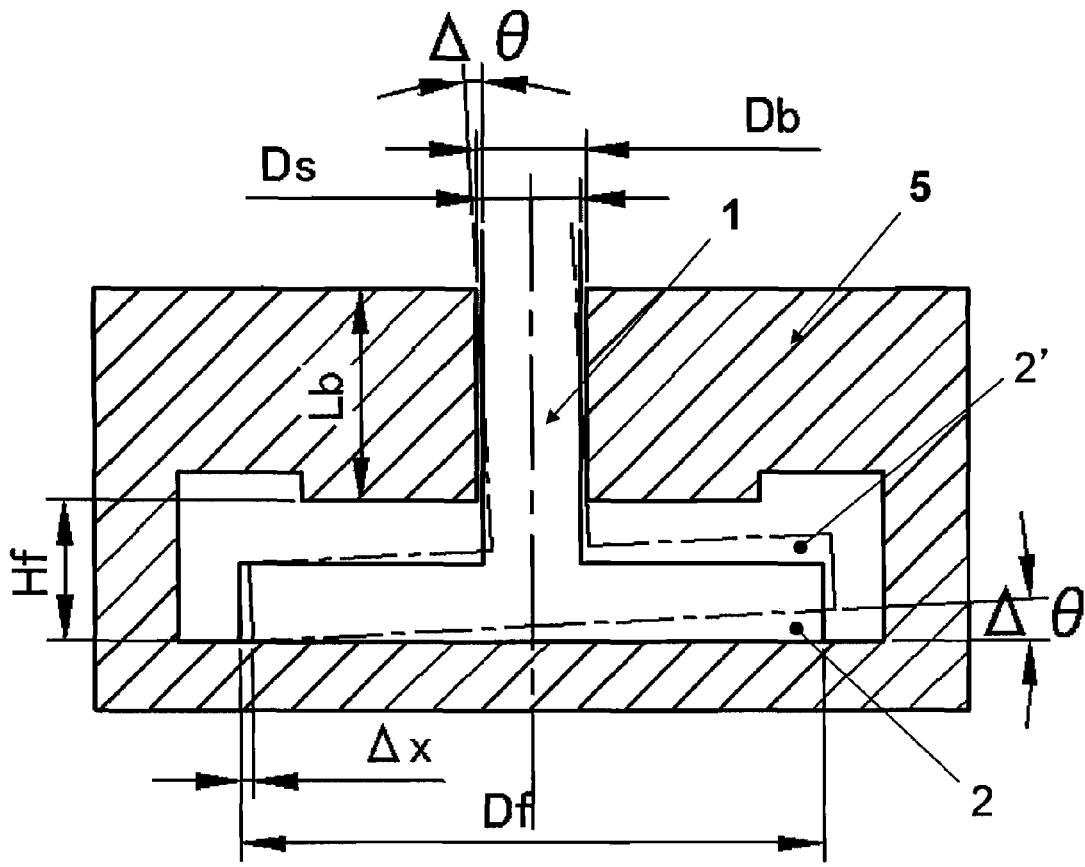
FIG. 4 is a schematic of when the thrust bearing is tilted in Embodiment 1 of the present invention.

When the thrust flange 2 is tilted as shown in FIG. 3B or FIG. 4, the outer periphery of the thrust flange 2 become eccentric by an amount Δx. This value, however, is just a few microns, and is on the order of less than 1/10 the above-mentioned ΔRt2 so ignoring the eccentricity Δx poses substantially no problem. More specifically, if we assume that the bearing hole inside diameter Db is 2.404 mm, the shaft diameter Ds is 2.4 mm, the radial bearing length Lb is 1.23 mm, and the thrust bearing gap height Hf is 0.465 mm, then the tilt angle of the shaft 1 is 0.186 degree at most, and the eccentricity Δx is only 3.5 μm.

The region across from the rear face of the thrust flange 2 on the lower end side of the sleeve 5 is provided with a microscopic gap (15 μm here) in the axial direction away from the thrust flange 2 in the region 5c across from the inner peripheral rear face, and this restricts the movement of the rotating part in the axial direction. On the outer peripheral side, a thrust rear face-side recess 5a is provided as a larger gap (0.1 mm here), which suppresses the increase in viscous frictional torque in the thrust bearing. As a result, the settings are such that when a gyro moment is imparted, the thrust flange 2 tilts and the sleeve 5 and the rear face of the thrust flange 2 do not slide.

TABLE 2

| disk diameter: | 47.7 mm | thrust groove width ratio: | 0.6 | thrust groove depth: | 3 μm | | |
|---|---|---|---|---|---|---|---|
| | | radial groove width ratio: | 0.4 | radial groove depth: | 5 μm | | |
| thrust herringbone turn-back diameter/herringbone groove outside diameter: 75% | | | | | | | |
| | Thrust groove outside diameter (mm) | | 5.4 | 5.0 | 4.6 | 4.2 | 3.0 |
| | Thrust groove outside diameter/disk diameter | | 11.4% | 10.1% | 9.3% | 8.4% | 5.9% |
| Noise | no noise | | 10 | 8 | 1 | | |
| | very small amount | | | 2 | 2 | 2 | |
| | small amount | | | | 5 | 6 | |
| | medium amount | | | 2 | 2 | 2 | 3 |
| | large amount | | | | | | 7 |

Table 2 shows the results of the above-mentioned organoleptic evaluation when the outside diameter Do of the thrust hydrodynamic grooves 3 was varied five ways from 3 mm to 5.4 mm. To take variance into account, five sample motors were produced of each type, the evaluation was conducted at the same amplifier level, headphone usage, etc., during reproduction, and the evaluation was conducted by two people.

The shape conditions at this time were as follows.

As shown in FIG. 5, the groove depth Δgr of the radial bearing 6 was 5 μm, and the groove angle θr was 15 degrees. The groove width ratio Lgr/Lr, which is the ratio of the length Lgr in the peripheral direction of the groove portion 8a to the pitch length Lr in the peripheral direction, was set to be 0.4.

Figure 2B:
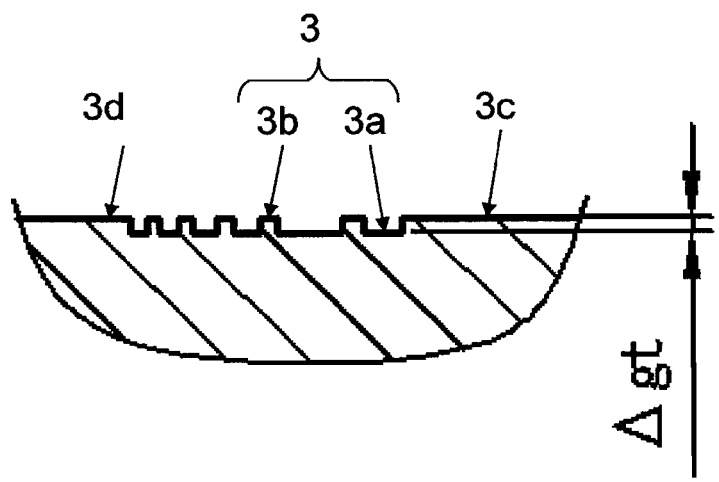
FIG. 2B is a lateral cross section of the thrust hydrodynamic groove.

Also, as shown in FIG. 2A, the groove angle θt was 15 degrees. Since the number of grooves was 12, the pitch angle θp of the grooves was 30 degrees. The width angle θgt in the peripheral direction of the grooves was 18 degrees. Therefore, the groove width ratio θgt/θp of the thrust bearing was 0.6. Furthermore, as shown in FIG. 2B the groove depth Δgt in a detail cross section of the thrust hydrodynamic groove (a cross section along the A-A line in FIG. 2A) was 3 μm.

Also, as shown in FIG. 3B, a chamfer Cc (preferably a fillet) of 0.05 mm is formed around the outer periphery of the thrust flange 2. Here, the outside diameter Do of the thrust hydrodynamic grooves 3 at the outer periphery of the thrust flange 2 is smaller than the outside diameter Df of the thrust flange by a radius of ΔRt1=0.1 mm, and an outer peripheral ridge 3c is formed to the outside of this. Therefore, the outer The exact dimensions of the thrust hydrodynamic grooves 3 were determined as follows. The outside diameter Df of the thrust flange 2 shown in detail view in FIG. 3A was set to be 0.2 mm larger than the outside diameter Do of the thrust hydrodynamic grooves 3 provided to the thrust plate 7.

The annular outer peripheral ridge 3c is formed around the outer periphery of the thrust hydrodynamic grooves 3. When a gyro moment M is received, the outermost periphery is where there is the possibility that the thrust flange 2 will tilt and initially come into contact, and if the thrust hydrodynamic grooves 3 are formed in this portion, a beating sound with a frequency fb will be generated that is proportional to the number of grooves and to the rotational speed of the motor during contact. Incidentally, if the number of grooves in the thrust hydrodynamic grooves 3 is 12 and the rotational speed is 3600 rpm, then fb=12×3600/60=720 Hz, and the higher harmonic components of this fb account for most of the noise. Third- to fifth-order higher harmonic components are from 2.16 to 3.60 kHz, which can be easily heard by the human ear, and grate on the ear. The intent here was to reduce noise in the event of an impact, by forming a ridge at the outer periphery so that contact would be smoother at this portion.

The inside diameter Di of the thrust hydrodynamic grooves 3 was fixed at 2.1 mm.

The diameter Dm of the middle turn-back part of the herringbone pattern was set on the basis of Formula 1. Here, Δd is the amount of imbalance of pump-in or pump-out, and is set to be 0.2 mm or less. Setting to 0.1 mm or less is better yet.

The larger is this amount, the greater is the flow of lubricant in the thrust bearing 15, and a powerful pump-in or pump-out force is generated. To put this another way, when Δd is zero, the lubricant in the thrust bearing 15 is in a substantially balanced state in an ideal state.

Figure 12:
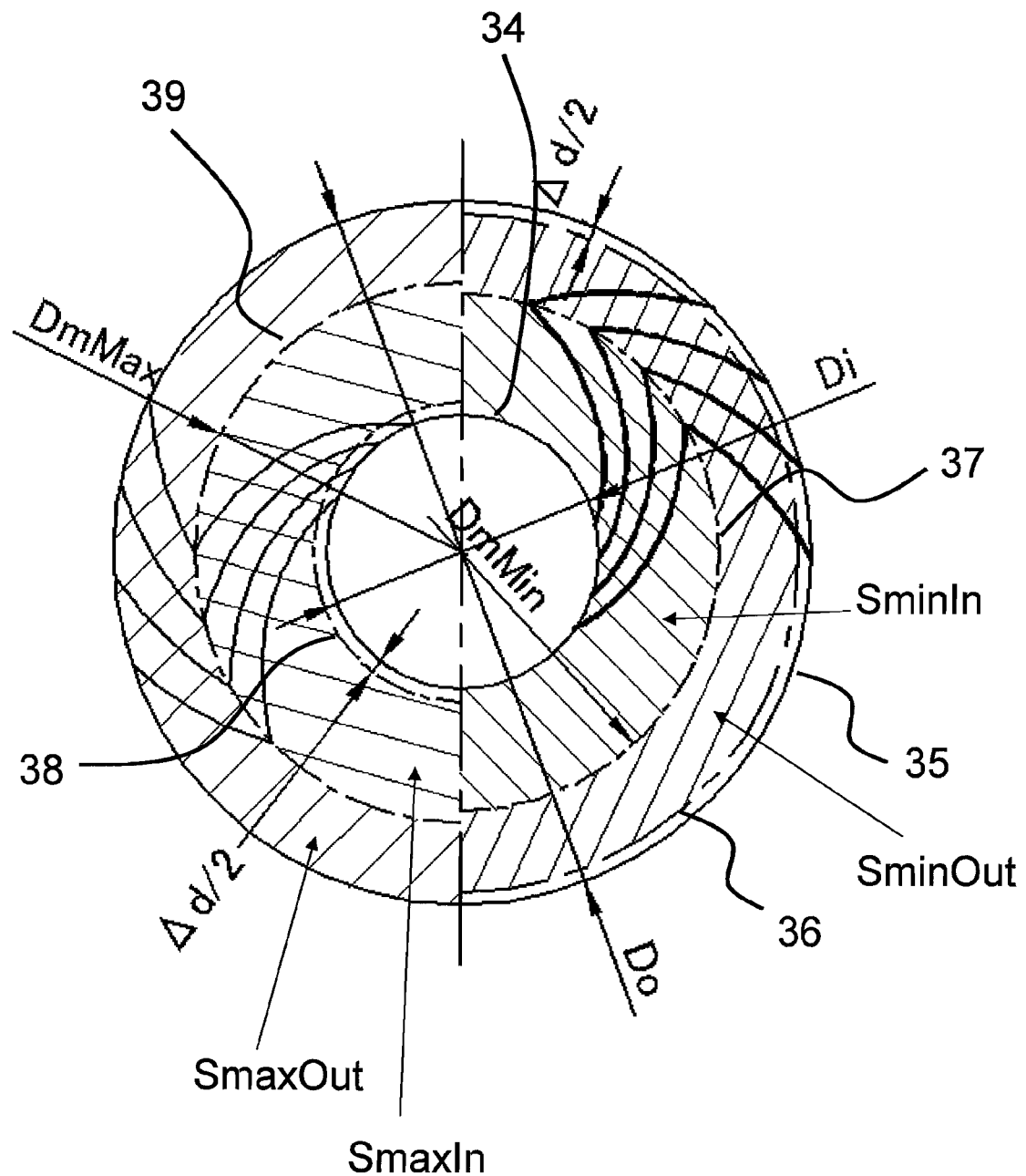
FIG. 12 is a detailed plan view of the thrust hydrodynamic groove of the present invention.

In the case of pump-in here, as shown in the right half of FIG. 12, a circle 36 is scribed whose diameter is smaller by Δd than the outer peripheral circle 35 (the outside diameter Do). A circle 37 is scribed between the circle 36 and the inner peripheral circle 34 (the inside diameter Di). The diameter Dmmin of the circle 37 is determined so that the surface area of the region SminOut between the circle 37 and the circle 36 will be equal to the surface area of the region SminIn between the circle 37 and the inner peripheral circle 34. More specifically, Dmmin may be set to 3.9655 mm to achieve a "pump-in of 0.2 mm" when the outside diameter Do is 5.4 mm and the inside diameter Di is 2.1 mm. Dmmin may be set to 4.0311 mm to achieve a "pump-in of 0.1 mm."

In the case of pump-out, as shown in the left half of FIG. 12, a circle 38 is scribed whose diameter is larger by Δd than the inner peripheral circle 34. A circle 39 is scribed between the circle 38 and the outer peripheral circle 35 (the outside diameter Do). The diameter Dmmax of the circle 39 is determined so that the surface area of the region SmaxOut between the circle 39 and the outer peripheral circle 35 will be equal to the surface area of the region SmaxIn between the circle 39 and the circle 38. More specifically, Dmmax may be set to 4.1503 mm to achieve a "pump-out of 0.2 mm" when the outside diameter Do is 5.4 mm and the inside diameter Di is 2.1 mm. Dmmax may be set to 4.1231 mm to achieve a "pump-out of 0.1 mm."

Thus putting Dm close to being in a balanced state is done for the following two reasons.

(1) When Dm is smaller, more lubricant is collected from the outer periphery toward the inner periphery of the thrust hydrodynamic grooves 3, but at low temperatures too much is collected, which is undesirable because the amount of float in the axial direction becomes excessive.

(2) When Dm is increased, angular stiffness rises when the motor reaches rated speed, but a pump-out type of configuration results, and it is more difficult for the lubricant to get inside the thrust bearing at start-up. Also, if the pump-out amount is large, pressure tends to be negative near the center of the thrust bearing 15, and if bubbles are produced, the result is an increase in NRRO (non-repetitive runout) in the axial direction.

Formula 1

$$\sqrt{\left(\frac{(Do-\Delta d)^2 + Di^2}{2}\right)} \leq Dm \leq \sqrt{\left(\frac{Do^2 + (Di+\Delta d)^2}{2}\right)}, \quad (1)$$

where $\Delta d \leq 0.2$ mm

Furthermore, the diameter Dm of the middle turn-back part is set to be at least 70% of the outside diameter Do. This makes it possible to raise the angular stiffness of the bearing by having the radial position at which maximum pressure is generated (this may be substantially considered to be near the middle turn-back part) can be moved as far outward as possible.

With the spindle motor configured as above, the outside diameter Df of the thrust flange 2 and the outside diameter Do of the thrust hydrodynamic grooves 3 were both varied. As shown in Table 2, the noise level when the thrust groove outside diameter Do is less than 5 mm was found to be clearly greater when Do was smaller. Meanwhile, it was found that if the outside diameter Do of the thrust hydrodynamic grooves 3 is at least 10% of the outside diameter Dd of the disk-shaped medium 20, noise will decrease sharply, and can be suppressed to a level that is almost unnoticeable. In particular, at 5.4 mm (11.4% of the outside diameter Dd of the disk-shaped medium 20), no bearing sliding noise whatsoever could be heard.

Figure 8:
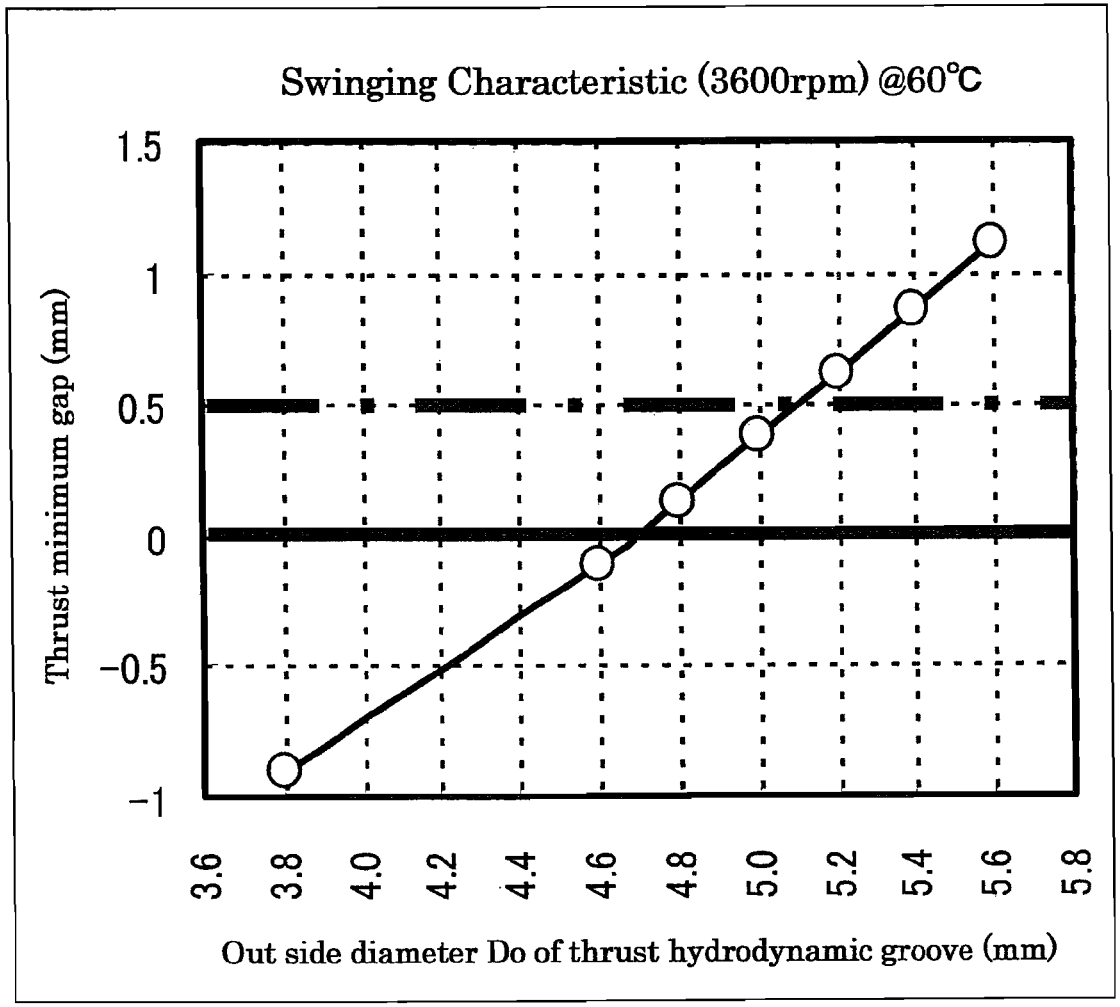
FIG. 8 is a graph of the relationship between the amount of float and the thrust minimum gap during swinging and the thrust hydrodynamic groove outside diameter.

The reason why noise reduction could be achieved in this way was examined by numerical analysis simulation. FIG. 8 shows the results of this. The outside diameter Do of the thrust hydrodynamic grooves 3 was varied, and the data were plotted to see how the minimum gap changed in the thrust bearing when a gyro moment was applied and the thrust flange tilted. The horizontal axis of the graph is the outside diameter Do of the thrust hydrodynamic grooves 3, while the vertical axis is the minimum gap. The various parameters are based on what has been discussed up to this point. The environment temperature was 60° C., which means that the experiment conditions were exactly the same as in Table 2.

In calculating the minimum gap, the angular stiffness was found by calculating the tilt of the thrust flange when a unit moment was applied, and the minimum gap was found when the above-mentioned gyro moment M was applied. As shown in FIG. 8, in the region in which the outside diameter Do of the thrust hydrodynamic grooves 3 is 4.7 mm or less, the minimum gap has a negative value. This indicates that the thrust flange 2 is sliding and digging into the thrust plate 7 in the thrust bearing 15, and the generation of noise is inevitable in this situation. On the other hand, when the outside diameter Do is set to greater than 4.7 mm, the minimum gap becomes positive, and it can be seen that a state of no contact can be maintained. This result is for when the various dimensions, including those of the bearing and the electromagnetic circuit portion, are exactly as designed, and furthermore, when the calculations included no warpage, surface roughness, etc., in the thrust bearing 15. Therefore, with an actual model, when fluctuation causes and variance in these ignored parameters are added in, about 0.5 μm at the least must be ensured in the design. When we compare the results in Table 2 from this standpoint, it can be concluded that in the evaluation results in FIG. 8, it is rational for Do to be set to at least 10% of the outside diameter Dd of the disk-shaped medium 20. Conversely, it is preferable for the surface of the thrust bearing 15 to be made as smooth as possible, and to have little warpage, and to be set to 1 μm or less if possible.

Specifically, the outside diameter Do of the thrust hydrodynamic grooves 3 is set to be at least 10% of the outside diameter Dd of the disk-shaped medium 20. It is also at least twice the diameter Ds of the shaft 1. This also contributes to suppressing the viscous frictional torque of the bearing as a whole because the thrust bearing 15 handles the angular stiffness and the shaft 1 only contributes to suppressing eccentricity.

Next, an experiment was conducted to ascertain the effects of parameters other than the outside diameter Do, with the outside diameter Do of the thrust hydrodynamic grooves 3 fixed at 5 mm, which is 10% of the outside diameter Dd of the disk-shaped medium 20. Table 3 shows the results of conducting an organoleptic evaluation of noise in the same manner as for Table 2, with the ratio varied between the groove depth Δgr of the radial bearing 6 and the groove depth Δgt of the thrust bearing. The groove width ratio of the radial bearing 6 and the groove width ratio of the thrust bearing 15 were each set at 0.5.

TABLE 3

| disk diameter: | 47.7 mm | thrust groove outside diameter/disk outside diameter: 10.1% | | | | | |
|---|---|---|---|---|---|---|---|
| | | thrust groove width ratio: | 05 | | | | |
| | | radial groove width ratio: | 0.5 | radial groove depth: | 5 μm | | |
| | | thrust HGB turn-back diameter/HGB groove outside diameter: 70% | | | | | |
| | Thrust groove depth/radial groove depth | 0.6 | 0.75 | 0.8 | 1 | 1.2 | 1.33 |
| | Thrust groove depth $\Delta gt$ | 3 | 3 | 4 | 5 | 6 | 8 |
| | Radial groove depth $\Delta gr$ | 5 | 4 | 5 | 5 | 5 | 6 |
| Noise | no noise | 8 | 6 | 5 | 1 | | |
| | very small amount | 2 | 4 | 5 | 5 | 1 | |
| | small amount | | | | 3 | 5 | |
| | medium amount | | | | 1 | 2 | 2 |
| | large amount | | | | | 2 | 8 |

As shown in Table 3, the region concluded to have no noise or a very small amount of noise increased when the groove depth $\Delta gt$ of the thrust bearing 15 was made less than the groove depth $\Delta gr$ of the radial bearing 6. The reason for this is believed to be that when the groove depth $\Delta gr$ of the radial bearing 6 is set larger than the groove depth $\Delta gt$ of the thrust bearing 15, the angular stiffness of the radial bearing becomes much lower than the angular stiffness of the thrust bearing. Therefore, when a disturbance torque is applied, the gyro moment produced perpendicular to the rotational axis and the disturbance torque are received by the thrust bearing 15 alone, so there is no interference with the radial bearing 6 that would lead to bearing malfunction.

Next, an experiment was conducted to ascertain the effect of the groove width ratio of the thrust bearing and the groove width ratio of the radial bearing (Table 4). What is different from Table 3 is that while the groove width ratio was held constant in the experiment shown in Table 3, in this experiment the groove depth was held constant. Here, the groove depth $\Delta gt$ of the thrust bearing 15 and the groove depth $\Delta gr$ of the radial bearing 6 were both 5 μm. As shown in Table 4, the noise level was lower when the groove width ratio of the thrust bearing 15 was set higher than the groove width ratio of the radial bearing 6 (a state in which the groove part 3a is wider than the ridge part 3b).

TABLE 4

| disk diameter: 47.7 mm | thrust groove outside diameter/disk outside diameter: | 10.1% | | | | | |
|---|---|---|---|---|---|---|---|
| | thrust groove depth: | 5 μm | | | | | |
| | radial groove depth: | 5 μm | | | | | |
| thrust herringbone turn-back diameter/herringbone groove outside diameter: 70% | | | | | | | |
| | Thrust groove width ratio | 0.6 | 0.6 | 0.6 | 0.5 | 0.4 | 0.3 |
| | Radial groove width ratio | 0.4 | 0.5 | 0.6 | 0.5 | 0.4 | 0.6 |
| Noise | no noise | 7 | 6 | 4 | 1 | | |
| | very small amount | 3 | 4 | 4 | 4 | 3 | |
| | small amount | | | 3 | 4 | 5 | |
| | medium amount | | | | 1 | 2 | 1 |
| | large amount | | | | | | 9 |

As can be seen above, it was found that noise can be suppressed if either or both of the following measures are incorporated.

1) The outside diameter Do of the thrust hydrodynamic grooves 3 is set to be at least 10% of the outside diameter Dd of the disk-shaped medium 20, and the groove depth of the radial bearing is made larger than the groove depth of the thrust bearing.

2) The outside diameter Do of the thrust hydrodynamic grooves 3 is set to be at least 10% of the outside diameter Dd of the disk-shaped medium 20, and the groove width ratio of the radial bearing is made smaller than the groove width ratio of the thrust bearing.

Next, in Table 5, Comparative Examples 1 and 2 were added to the results given above. The current at 0° C. is also given here. The parameters were as given below.

TABLE 5

| | | Working Example 1 | Working Example 2 | Comparative Example 1 | Comparative Example 2 |
|---|---|---|---|---|---|
| Noise | no noise | 10 | 8 | | |
| | very small amount | | 2 | 3 | |
| | small amount | | | 5 | |
| | medium amount | | | 2 | 1 |
| | large amount | | | | 9 |
| Current ratio | | 1.04 | 1.02 | 1.65 | 1.00 |

1) Working Example 1 thrust hydrodynamic groove outside diameter: 5.4 mm
groove width ratio: thrust/radial=0.6/0.4
groove depth: thrust/radial=3/5

2) Working Example 2 thrust hydrodynamic groove outside diameter: 5.4 mm
groove width ratio: thrust/radial=0.5/0.5
groove depth: thrust/radial=3/5

3) Comparative Example 1 thrust hydrodynamic groove outside diameter: 5 mm (spiral groove shape)
groove width ratio: thrust/radial=0.5/0.5
groove depth: thrust/radial=10/5

The lubricant employed in this Comparative Example 1 was one that had a high viscosity at high temperature (more specifically, the kinetic viscosity at 60° C.), in an attempt to suppress noise by improving the radial bearing stiffness at high temperatures. More specifically, the lubricant used here had a kinetic viscosity of 8 mm²/sec at 60° C., and 62 mm²/sec at 0° C.

4) Comparative Example 2 thrust hydrodynamic groove outside diameter: 4.6 mm
groove width ratio: thrust/radial=0.3/0.6
groove depth: thrust/radial=5/5

As shown in Table 5, the noise level in Working Examples 1 and 2 was of course lower than in Comparative Example 2, and the motor current also only increased by a few percent.

On the other hand, while the noise level in Comparative Example 1 is somewhat improved over that in Comparative Example 2, it does not reach the level of posing no practical problem (no noise or very small amount), and current also increased 65%. This embodiment can thus be seen to suppress noise markedly, with almost no increase in current.

Next, whether or not this concept could be applied to disk size was also checked. Four disk sizes were imagined here: 1.3 inch, 1.8 inch, 2 inch, and 2.2 inch. The 2 inch and 2.2 inch sizes are tentative specifications, and the disks used in the experiment were made from Duralmin (specific gravity of 2.8). Table 6 shows the specifications of the various disk sizes.

TABLE 6

| | Disk size | | | |
|---|---|---|---|---|
| | 1.3 | 1.8 | (2) | (2.2) |
| Outside diameter (mm) | 33 | 48 | 53 | 58 |
| Inside diameter (mm) | 7 | 12 | 20 | 20 |
| Thickness (mm) | 0.450 | 0.508 | 0.635 | 0.635 |
| Specific gravity | 2.51 | 2.51 | 2.80 | 2.80 |
| Weight (g) | 0.92 | 2.16 | 3.36 | 4.13 |
| Inertial moment (g-cm$^2$) | 1.31 | 6.62 | 13.49 | 19.46 |

The outside diameter Do of the thrust hydrodynamic grooves 3 was varied according to the disk size. Also, the groove width ratio of the thrust bearing 15 was set higher than the groove width ratio of the radial bearing 6, and the groove depth of the thrust bearing 15 was set smaller than the groove depth of the radial bearing 6. The results as shown in Table 7, and it can be seen that in every case noise was reduced to a level that posed no practical problem. It can also be seen from the table that when the disk outside diameter goes over 53 mm, noise exceeds the permissible level and quickly worsens.

TABLE 7

| | Disk outside diameter | 33 | 48 | 53 | 58 |
|---|---|---|---|---|---|
| | Thrust hydrodynamic groove outside diameter | 3.7 | 5.4 | 6.0 | 6.5 |
| Noise | no noise | 10 | 10 | 7 | 3 |
| | very small amount | | | 3 | 3 |
| | small amount | | | | 3 |
| | medium amount | | | | 1 |
| | large amount | | | | |

The following conclusions can be reached from the above.

When the outside diameter Do of the thrust hydrodynamic grooves 3 of the thrust bearing 15 is set to a size that is at least 10% the outside diameter Dd of the disk-shaped medium 20, the angular stiffness of the thrust bearing 15 is higher, so even if a disturbance torque should be applied, wear or noise caused by metal contact inside the bearing can be suppressed.

Also, since the groove width ratio of the thrust bearing 15 was greater than the groove width ratio of the radial bearing 6, more lubricant could be efficiently collected in the thrust bearing 15, which afforded even higher bearing stiffness (angular stiffness). Here, the groove width ratio of the radial bearing 6 was made lower than that of the thrust bearing 15, the angular stiffness in the radial bearing 6 was further lowered relative to the thrust bearing, and the configuration was such that the gyro moment is received mainly by the thrust bearing 15, and the radial bearing 6 only suppresses eccentricity of the disk-shaped medium 20.

Accordingly, when a gyro moment is produced, the radial bearing 6 and the thrust bearing 15 do not interfere with each other, and abnormal behavior caused by the gyro moment can be prevented. Furthermore, since the groove width ratio of the thrust bearing 15 is large, even though the outside diameter of the thrust bearing 15 is increased, an increase in viscous frictional torque in the thrust bearing 15 can still be suppressed.

Also, the deeper the grooves, the more lubricant can be collected. However, but in the case of a low-viscosity lubricant such as is used in mobile applications, the bearing stiffness is at its peak at a very small groove depth (such as under 1 μm), as shown in FIG. 9, and a groove depth greater than this will actually result in a decrease in bearing stiffness. Therefore, the shallower the groove the higher the bearing stiffness can be. Furthermore, the deeper the groove, the lower the viscous frictional torque. Here, the angular stiffness in the radial bearing is further lowered relative to the thrust bearing by making the groove depth of the radial bearing 6 greater than the groove depth of the thrust bearing 15, and the design is such that the gyro moment is received mainly by the thrust bearing, and the radial bearing only suppresses eccentricity of the disk. Accordingly, when a gyro moment is produced, the radial bearing and thrust bearing do not interfere with each other, and abnormal behavior caused by the gyro moment can be suppressed. Furthermore, since the groove depth of the radial bearing is greater, the increase in viscous frictional torque in the radial bearing can be reduced.

Specifically, the angular stiffness of the thrust bearing 15 can be raised by reducing the amount of float. And since the radial bearing 6 only needs to be stiff enough to suppress eccentricity, there is no problem with setting a large radial gap in the radial bearing 6. As a result, viscous frictional torque can be reduced, particularly at low temperatures, and a motor that consumes less power can be provided. Also, since the radial gap can be larger, less precision is needed in motor assembly, which contributes to lower costs.

As discussed above, at disk sizes expected to be used with mobile HDDs, a spindle motor can be provided with which no noise is generated by the sliding that would ordinarily be expected to occur, and furthermore, with which a low power consumption can be achieved that was impossible in the past.

Also, because noise reduction was achieved as above, no abnormal wear whatsoever was seen even after repeated sliding at high temperature. This makes it possible to provide a HDD whose reliability is high that bearing performance can be maintained even after extended use at high temperature.

In the above description, an example was given in which the depth of the thrust hydrodynamic grooves 3 was 3 μm, but the depth may be set within a range of 2 to 5 μm, and the depth of the radial hydrodynamic grooves 8 may be set to a value larger than this.

Also, the magnetic attraction force may be within a range of 5 to 25 times. More preferably, the range is from 10 to 25 times. This value may be suitably set according to the float state of the thrust bearing 15 at the time of start-up, but angular stiffness can be raised by setting the value as high as possible.

In the above description, the depth of the thrust hydrodynamic grooves 3 was held constant regardless of the radial position, but the present invention is not limited to this. Preferably, as shown in FIG. 3A, the structure is such that the grooves are deeper on the inner peripheral side and shallower on the outer peripheral side. In this case, when the groove depth of the radial bearing 6 is 5 μm, for example, the depth may be 3 μm on the outer peripheral side and 4.5 μm on the inner peripheral side, for instance. Furthermore, the grooves may be deeper (6 μm) than the grooves of the radial bearing on just the inner peripheral side. This allows for a further reduction in the viscous frictional torque in the inner peripheral part. When the outer peripheral side is thus made shallower than the radial bearing, a stronger reaction is produced when the thrust flange 2 is tilted, so angular stiffness is even higher. In a state in which no large gyro moment is produced (when almost no panning is performed), the viscous frictional torque can be lowered in the thrust bearing 15, and this is even more effective at reducing power consumption.

Also, a case was described above in which no particular thrust hydrodynamic groove was provided to the rear face side (sleeve side) of the thrust flange 2, but the present invention is not limited to this, and a second thrust hydrodynamic groove may be provided. Again in this case, it is preferable for the second thrust hydrodynamic groove to be provided only to the inner peripheral part, with the outer peripheral side serving as an escape.

Embodiment 2

Figure 10:
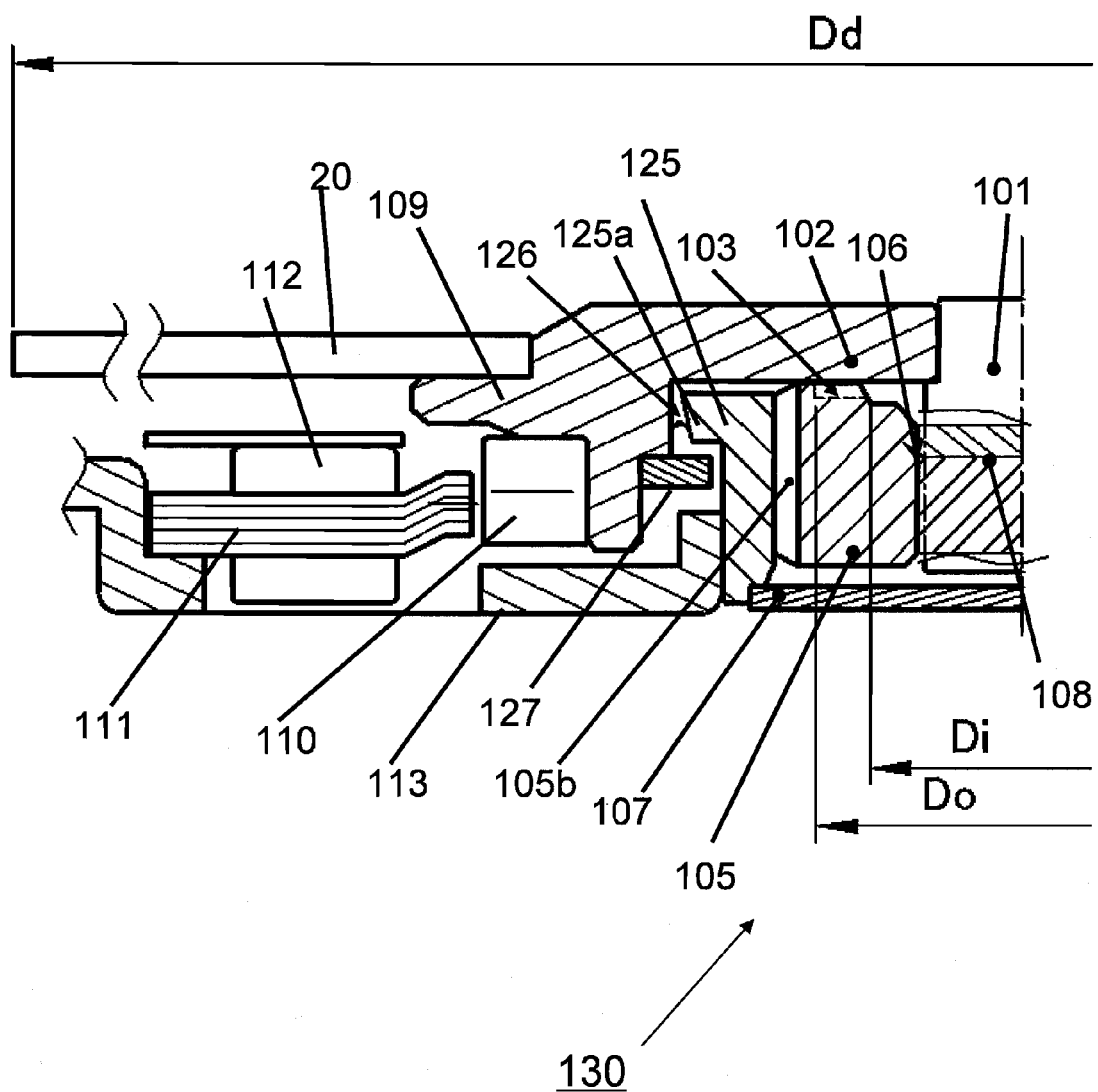
FIG. 10 is a cross section of the spindle motor in Embodiment 2 of the present invention.

FIG. 10 is a horizontal half cross section of the spindle motor in Embodiment 2 of the present invention. A hub 109 having a flange portion 102 around its inner periphery is fixed to the upper end of a shaft 101. The outer peripheral cylindrical part of the shaft 101 is rotatably fitted in the bearing hole of an inner sleeve 105. The inner sleeve 105 is made of a sintered metal based on iron or copper, and is fixed to an outer sleeve 125. A D-cut or vertical groove is formed around the outer periphery of the inner sleeve 105, a communicating hole 105b is formed between the outer sleeve 125 and the inner sleeve 105, which allows a lubricant 126 to circulate inside the bearing. A seal plate 107 is fixed to the lower end of the outer sleeve 125, and blocks off the lower end side of the outer sleeve.

A thrust hydrodynamic groove 103 is formed in a spiral shape at the upper end of the inner sleeve 105, constituting a thrust hydrodynamic portion with a flange portion 102 provided to the hub 109. Here, the thrust hydrodynamic groove 103 has an inside diameter Di and an outside diameter Do. Radial hydrodynamic grooves 108 are formed in a herringbone pattern in the inner peripheral cylindrical face of the inner sleeve 105. Here, the radial hydrodynamic grooves 108 are formed asymmetrically, being longer on the lower side from the turn-back point, so as to generate a strong pump-up force. The purpose of this is to strike a balance with the pump-in force of the thrust hydrodynamic groove 103 and thereby suppress the movement speed of the lubricant 126 through the inside of the bearing.

Further, a tapered flange portion 125a is formed at the upper end of the outer sleeve 125, constituted a taper seal with the inner peripheral part of the hub 109. A stopper 127 is fixed at the lower end side of the hub 109, and is disposed across from the tapered flange portion 125a in the axial direction, which prevents the rotating body from coming loose.

Here, the outside diameter Do of the thrust hydrodynamic groove 103 is set to be at least 10% of the outside diameter of the disk-shaped medium 20. In the case of a spiral shape, the angular stiffness tends to be somewhat lower than with a herringbone pattern, so the diameter is preferably set to be at least 12%, and more preferably at least 15%. The inside diameter Di is set to be at least 75% of the outside diameter Do. A annular ridge is formed on the outer peripheral side of the thrust hydrodynamic groove 103, and prevents a loud noise from being generated if a gyro moment should cause the flange portion 102 to tilt and directly hit the ridge part and groove part of the thrust hydrodynamic groove 103.

This constitution prevents noise from being generated even if a strong swing is imparted during use.

The thrust hydrodynamic groove 103 had a spiral shape in the above description, but may instead have a herringbone pattern as in Embodiment 1.

Embodiment 3

Figure 13:
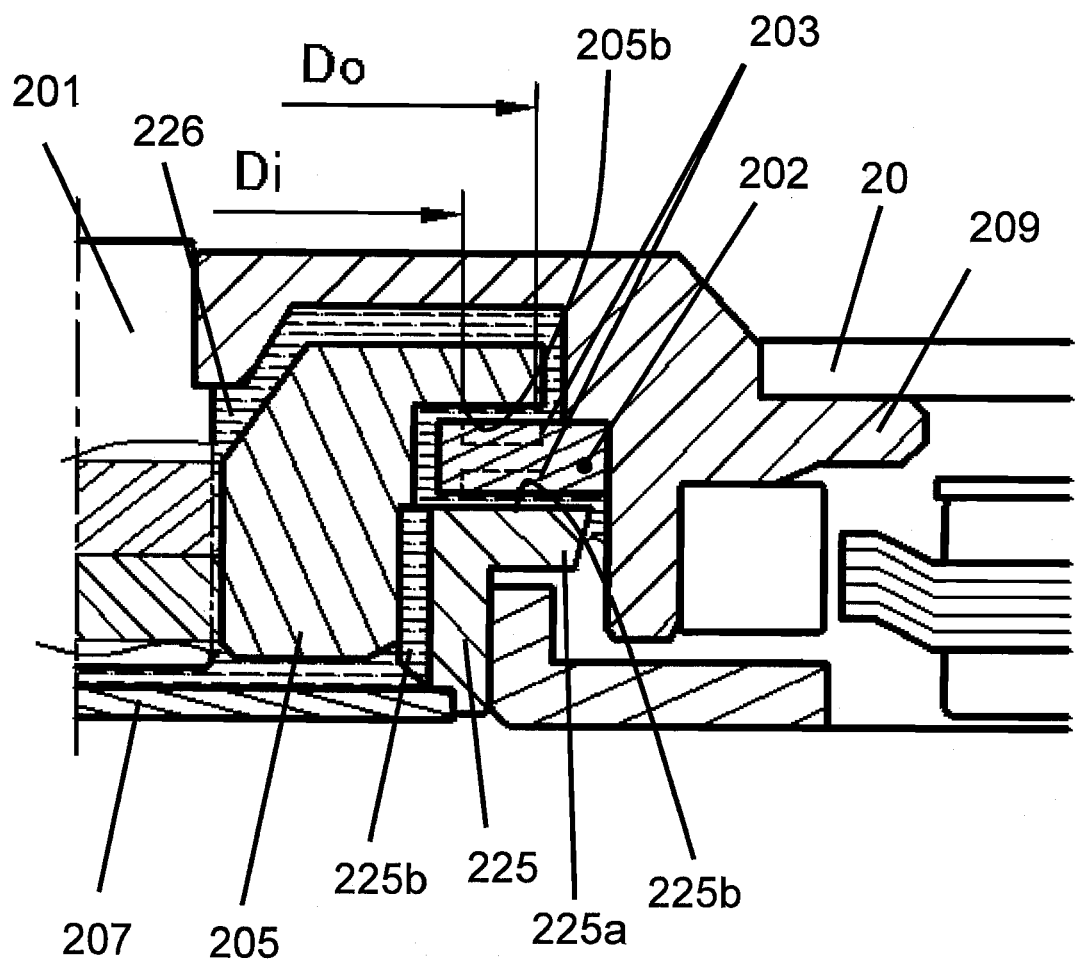
FIG. 13 is a cross section of the spindle motor in Embodiment 3 of the present invention

FIG. 13 is a horizontal half cross section of the spindle motor in Embodiment 3 of the present invention. A hub 209 having a flange portion 202 around its inner periphery is fixed to the upper end of a shaft 201. The outer peripheral cylindrical part of the shaft 201 is rotatably fitted in the bearing hole of an inner sleeve 205. The inner sleeve 205 is made of a sintered metal based on iron or copper, and is fixed to an outer sleeve 225. A vertical groove is formed around the inner periphery of the outer sleeve 225, a communicating hole 225b is formed between the inner sleeve 205 and the outer sleeve 225, which allows a lubricant 226 to circulate inside the bearing. A seal plate 207 is fixed to the lower end of the outer sleeve 225, and blocks off the lower end side of the outer sleeve 225.

A thrust hydrodynamic groove 203 is formed in a spiral shape at the both end of the flange portion 202, constituting a thrust hydrodynamic portion with a flange portion 202 provided to the hub 209. Here, the thrust hydrodynamic groove 203 has an inside diameter Di and an outside diameter Do. Radial hydrodynamic grooves 208 are formed in a herringbone pattern in the inner peripheral cylindrical face of the inner sleeve 205.

Further, a tapered flange portion 225a is formed at the upper end of the outer sleeve 225, constituted a taper seal with the inner peripheral part of the hub 209.

Here, the outside diameter Do of the thrust hydrodynamic groove 203 is set to be at least 10% of the outside diameter of the disk-shaped medium 20. In the case of a spiral shape, the angular stiffness tends to be somewhat lower than with a herringbone pattern, so the diameter is preferably set to be at least 12%, and more preferably at least 15%. The inside diameter Di is set to be at least 75% of the outside diameter Do. An annular ridge is formed on the outer peripheral side of the thrust hydrodynamic groove 203, and prevents a loud noise from being generated if a gyro moment should cause the flange portion 202 to tilt and directly hit the ridge part and groove part of the thrust hydrodynamic groove 203.

This constitution prevents noise from being generated even if a strong swing is imparted during use.

The thrust hydrodynamic groove 203 had a spiral shape in the above description, but may instead have a herringbone pattern as in Embodiment 1.

Also, Embodiments 1, 2 and 3 above were both described for a rotating shaft configuration, but the present invention is not limited to this, and may instead be applied to a stationary shaft configuration.

Also, Embodiments 1, 2 and 3 above were both described a case in which one disk-shaped medium was mounted, but the present invention is not limited to this. For example, with a disk that is smaller in diameter and thickness, such as a 1.3 inch disk, the inertial moment is small, so adequate angular stiffness can be ensured even when two or even more disks are mounted, so the technology of the present invention can be applied. When there are many disks, or the disks are thick, etc., noise can still be suppressed if the technological concept of the present invention is further extended and applied. In such a case, the temperature range over which the device will be used, and the power consumption of the motor should be taken into account.

The spindle motor pertaining to the present invention has the effect of suppressing an increase in motor current in low temperature environments and of suppressing bearing noise generated during swinging in high temperature environments, and is useful as a spindle motor for a HDD used in mobile applications and so forth that entail use under high temperatures. Also, a HDD in which this spindle motor is installed consumes less current, is quieter, and undergoes less sliding wear, giving it higher reliability, and it can withstand extended use under harsh conditions, so the quality and reliability of the device in which this HDD is installed can also be improved.

The invention claimed is:

1. A spindle motor that rotates a rotary-side member in relation to a stationary-side member around a shaft, comprising:
    said shaft;
    a sleeve having a bearing hole into which said shaft is relatively rotatably fitted via a microscopic gap in the radial direction;
    a radial hydrodynamic groove provided in the axial direction to an inner peripheral surface of said bearing hole of said sleeve and/or to an outer peripheral surface of said shaft; and
    a thrust hydrodynamic groove provided in the radial direction of the rotation to a surface of the rotary-side member and/or a surface of the stationary-side member, which are mutually opposed,
    wherein a groove width ratio of said radial hydrodynamic groove is smaller than a groove width ratio of said thrust hydrodynamic groove.

2. A disk-shaped medium recording and reproducing device, comprising:
    said spindle motor according to claim 1; and
    a disk-shaped medium.

* * * * *

UNITED STATES PATENT AND TRADEMARK OFFICE
CERTIFICATE OF CORRECTION

| | | |
|---|---|---|
| PATENT NO. | : 8,085,495 B2 | Page 1 of 1 |
| APPLICATION NO. | : 12/053810 | |
| DATED | : December 27, 2011 | |
| INVENTOR(S) | : Masafumi Kumoi et al. | |

It is certified that error appears in the above-identified patent and that said Letters Patent is hereby corrected as shown below:

On the title page, item [54] and column 1, line 1, title should read,

-- SPINDLE MOTOR AND DISK-SHAPED MEDIUM RECORDING AND REPRODUCING DEVICE --.

Signed and Sealed this
Thirteenth Day of March, 2012

David J. Kappos
*Director of the United States Patent and Trademark Office*